US008024660B1

(12) United States Patent
Quinn et al.

(10) Patent No.: US 8,024,660 B1
(45) Date of Patent: Sep. 20, 2011

(54) METHOD AND APPARATUS FOR VARIABLE HELP CONTENT AND ABANDONMENT INTERVENTION BASED ON USER BEHAVIOR

(75) Inventors: Christopher N. Quinn, Del Mar, CA (US); Anthony L. Creed, San Diego, CA (US); Kenichi Mori, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 1157 days.

(21) Appl. No.: 11/669,525

(22) Filed: Jan. 31, 2007

(51) Int. Cl.
G06F 3/00 (2006.01)
G06F 3/048 (2006.01)

(52) U.S. Cl. ......... 715/745; 715/783; 715/789; 715/760

(58) Field of Classification Search .................. 715/707
See application file for complete search history.

(56) References Cited

U.S. PATENT DOCUMENTS

| 4,905,163 | A | 2/1990 | Garber et al. |
|---|---|---|---|
| 4,964,077 | A | 10/1990 | Eisen et al. |
| 5,239,617 | A | 8/1993 | Gardner et al. |
| 5,485,544 | A | 1/1996 | Nonaka et al. |
| 6,233,570 | B1 | 5/2001 | Horvitz et al. |
| 6,262,730 | B1 | 7/2001 | Horvitz et al. |
| 6,289,317 | B1 | 9/2001 | Peterson |
| 6,300,950 | B1 | 10/2001 | Clark et al. |
| 6,625,267 | B1 | 9/2003 | Graham et al. |
| 7,194,685 | B2 | 3/2007 | Morrison |
| 7,590,572 | B2 * | 9/2009 | Larson ............... 705/31 |
| 7,680,708 | B1 * | 3/2010 | Mooney et al. ....... 705/31 |
| 7,680,756 | B2 * | 3/2010 | Quinn et al. ......... 706/50 |
| 7,707,087 | B1 * | 4/2010 | Rogers et al. ........ 705/35 |
| 7,716,094 | B1 * | 5/2010 | Sutter et al. ......... 705/31 |
| 7,747,484 | B2 * | 6/2010 | Stanley et al. ....... 705/31 |
| 7,753,258 | B1 * | 7/2010 | Quinn et al. ......... 235/379 |
| 2002/0015056 | A1 | 2/2002 | Weinlaender |
| 2002/0118220 | A1 | 8/2002 | Lui et al. |
| 2005/0054381 | A1 | 3/2005 | Lee et al. |
| 2005/0066236 | A1 | 3/2005 | Goeller et al. |
| 2005/0118996 | A1 | 6/2005 | Lee et al. |
| 2006/0178961 | A1 * | 8/2006 | Stanley et al. ....... 705/31 |
| 2006/0184410 | A1 | 8/2006 | Ramamurthy et al. |
| 2007/0050719 | A1 | 3/2007 | Lui et al. |
| 2007/0300174 | A1 * | 12/2007 | Macbeth et al. ..... 715/772 |

OTHER PUBLICATIONS

"Timetag: The New Standard in Time Tracking" 2004, Timetag, Inc. pp. 1-2. "Elite Professional Time and Expense Entry Solutions" http://www.thomsonelite.com/solutions, 2004, pp. 1-4.
"QuickBooks Time Tracker", Intuit, Inc., pp. 1-2.
"QuickBooks Time Tracker" Whitepaper, 2006 Intuit, Inc., pp. 1-2.
Tealeaf Press Release, "Tealeaf CX Implemented by Website of the Nation's Largest Retailer", Nov. 6, 2006, Tealeaf Technology, pp. 1-2.
"Winspector—Ultimate Windows Message Spy".
U.S. Appl. No. 10/751,194, filed Dec. 31, 2003.
U.S. Appl. No. 11/741,615, filed Apr. 27, 2007.
U.S. Appl. No. 11/565,367, filed Jan. 31, 2007.

* cited by examiner

*Primary Examiner* — Boris Pesin
*Assistant Examiner* — Brandon Parker
(74) *Attorney, Agent, or Firm* — Osha• Liang LLP

(57) ABSTRACT

Method and apparatus for variable help content and abandonment intervention based on customer behavior in computer applications. A pattern detection and intervention mechanism may be provided that may collect usage and possibly other data for the application for a plurality of users of the application and analyze the usage data to determine usage patterns. The collected data and determined usage patterns may then be used by the pattern detection and intervention mechanism to look for and detect deviations from expected behavior and/or patterns of abnormal behavior. Embodiments may provide one or more methods of intervention to provide context-specific help or otherwise assist users for which deviations from expected behavior and/or abnormal patterns of behavior are detected. The detection that users are having difficulty with the application and proactive intervention when such difficulties are detected may help to prevent the users from abandoning the application.

50 Claims, 12 Drawing Sheets

| Menu 1 | Menu 2 | Menu 3 | Menu 4 | Menu bar 352 |

Tool bar 354

| Tab 1 | Forms | Tab 3 | Tab 4 | Tab bar 356 |

MODULES

Module 1
Module 2
...

Current tax document 320 (Form 1)

FORMS

Form 1
Form 2
Form 3
Form 4
...

Description........................................................................ Field 322A Description.......... Field 322B Description......... Popup 370

If you are having difficulties with this Form and would like assistance, you can call our customer support staff at:

1-800-555-1111

Field 322C

Field 322D

Description........................................................................ Field 322E Description........................................................................ Field 322F Description........................................................................ Field 322G Display 350

*Figure 9*

METHOD AND APPARATUS FOR VARIABLE HELP CONTENT AND ABANDONMENT INTERVENTION BASED ON USER BEHAVIOR

BACKGROUND

Various software applications may involve the collection of data or other input from users, forms or documents that users may need to fill out, and/or a sequence of steps that the users may need to follow. The users of these applications may encounter various difficulties when interacting with the user interfaces presented by the applications. In some cases, the difficulty for a user may be such that the user may actually abandon the application. Conventionally, at least some vendors of software applications have collected "after the fact" data from the users of their products in the form of customer calls, chats, product feedback, etc. that may provide some information about where in the applications the users encountered difficulties. An example of such a software application is a tax preparation program.

Tax preparation software programs (hereinafter referred to as "tax programs") are available that assist tax preparers in preparing accurate tax returns and other tax forms for filing by or on behalf of a taxable entity with a governmental entity, e.g., a Federal, State, county, city, district, and/or other municipality (hereinafter collectively referred to as tax authorities). These tax programs guide the tax preparer through tax return processes for various tax authorities, and may automatically perform necessary tax preparations in accordance with data input and forms, schedules, tax data, tables, and formulas stored with or coded into the program. Personal and professional versions of tax programs may be offered. Professional versions may be used by tax one or more preparation professionals to prepare various tax returns for multiple taxable entities. Further, these tax programs may be used to prepare annual taxes, quarterly taxes, etc for filing with various tax authorities by or on behalf of taxable entities.

Typically, the tax preparer will enter necessary data and information via the user interface of the tax program, and, when done, access the user interface to direct the tax program to complete the tax return under preparation. The tax program may perform any necessary calculations using the entered data and information and in accordance with tax formulas relevant to the particular tax return under preparation (e.g. Federal tax return, State tax return, local tax return, etc.), and possibly data and information from other sources such as previous tax returns or other tax-related documents, to generate appropriate calculated values for certain fields of the tax return under preparation.

The completed tax return may indicate that the taxable entity owes taxes to the tax authority or that the taxable entity is owed a tax refund from the tax authority. The tax return may then be filed (electronically or conventionally) with the tax authority. If taxes are due, the tax amount may be, but is not necessarily, paid to the tax authority by the taxable entity at the time of filing. Conventionally, the tax payment may be transferred electronically or alternatively may be paid by check. If a refund is due, the refund amount may be paid to the taxable entity by the tax authority either electronically to an account (e.g., a bank account) of the taxable entity or by check.

The users of tax programs (tax preparers) may encounter various difficulties when preparing their tax return documents. In some cases, the difficulty for a user may be such that the user may actually abandon the tax program. Conventionally, at least some vendors of tax programs have collected data from these users of their products "after the fact" in the form of customer calls, chats, product feedback, etc. that may provide some information about where in the tax programs the users encountered difficulties.

SUMMARY

Various embodiments of a method and apparatus for variable help content and abandonment intervention based on customer behavior in computer software applications, including but not limited to tax preparation software programs (hereinafter referred to as tax programs), are described. In embodiments, a pattern detection and intervention mechanism may be provided that may collect usage and possibly other data for a plurality of users of the computer application and analyze the usage data to determine usage patterns. The collected data and determined usage patterns may then be used by the pattern detection and intervention mechanism to look for and detect deviations from expected behavior for users of the computer application and/or patterns of abnormal behavior. The pattern detection and intervention mechanism may provide one or more methods of intervention to provide context-specific help or otherwise assist the particular users for which deviations from expected behavior and/or abnormal patterns of behavior are detected. The detection that particular users are having difficulty with the application and proactive intervention when such difficulties are detected may help to lower frustration that may be caused by use of the computer application.

In one embodiment, usage data from the interactions of a plurality of users of a computer application with a user interface to the computer application may be collected. For example, a component of a pattern detection and intervention mechanism that resides on a server system coupled to a network may collect the usage data from user interactions with a plurality of instances of the computer application on client systems coupled to the network. One or more usage patterns for interactions with the user interface to the computer application may be determined from the collected usage data. In one embodiment, the determining of the one or more usage patterns may be performed in accordance with one or more statistical data analysis techniques applied to the collected usage data. Note that the usage patterns may include, but are not limited to, usage patterns that indicate expected or nominal interactions with the computer application and usage patterns that indicate abnormal interactions with the computer application. These abnormal interactions may indicate, for example, that a user is having difficulty with the computer application or that the user is likely to discontinue use of the computer application.

Interactions of a particular user with the computer application may be compared to the determined usage patterns to detect differences which may indicate, for example, that the particular user is having difficulty with the application. In one embodiment, usage data from the interactions of the particular user may be determined to deviate from a usage pattern that indicates expected or nominal interactions with the computer application. In one embodiment, usage data from the interactions of the particular user may be determined to match a usage pattern that indicates that a user is having difficulty with the computer application or that the user is likely to discontinue use of the computer application.

In one embodiment, the interactions of a particular user with the computer application may be compared to usage patterns specific to the particular user determined from previously collected interactions of the particular user with the computer application. Deviations from the usage patterns may be used as indications that the particular user is having difficulty with the computer application or that the particular user is likely to discontinue use of the computer application.

An intervention to offer assistance to the particular user with the computer application may be initiated in response to detecting that the particular user may be having difficulty with the application. In one embodiment, the intervention may include displaying help information related to the computer application. In one embodiment, the intervention may include displaying contact information for a support system of the computer application. The contact information may include, but is not limited to, one or more of a telephone number to the support system and a web address to a web site of the support system. In one embodiment, the intervention may include a support system of the computer application contacting the particular user. Contacting the particular user may include, but is not limited to, one or more of telephoning the particular user, instant messaging the particular user, text messaging the particular user, and sending an electronic mail message to the particular user.

In one embodiment, the computer application may be a tax preparation program. The comparison of the usage data from the interaction of the particular user with the determined usage patterns may, for example, indicate that the particular user is having difficulty in completing a particular electronic tax form via the user interface to the tax preparation program, and may further indicate that the particular user is likely to discontinue use of the tax preparation program. The intervention may include, but is not limited to, one or more of providing help information related to at least one aspect of the particular electronic tax form, providing an alternative user interface to at least a portion of the particular electronic tax form, and providing an option to automatically complete at least a portion of the particular electronic tax form.

While embodiments of the pattern detection and intervention mechanism are generally described herein in reference to tax preparation software programs, embodiments of the pattern detection and intervention mechanism may be implemented for other types of computer-implemented processes, programs, and applications (which may be collectively identified as computer applications), including but not limited to other types of financial software programs.

BRIEF DESCRIPTION OF THE DRAWINGS

FIG. 7 illustrates an exemplary, generic display and user interface that may be provided by a tax program according to one embodiment.

FIG. 8 illustrates an exemplary help page that may be automatically displayed in response to detecting a deviation from expected behavior or known pattern associated with user confusion or difficulty, according to one embodiment.

FIG. 9 illustrates an exemplary popup window that may be automatically displayed in response to detecting a deviation from expected behavior or known pattern associated with user confusion or difficulty, according to one embodiment.

Figure 1:
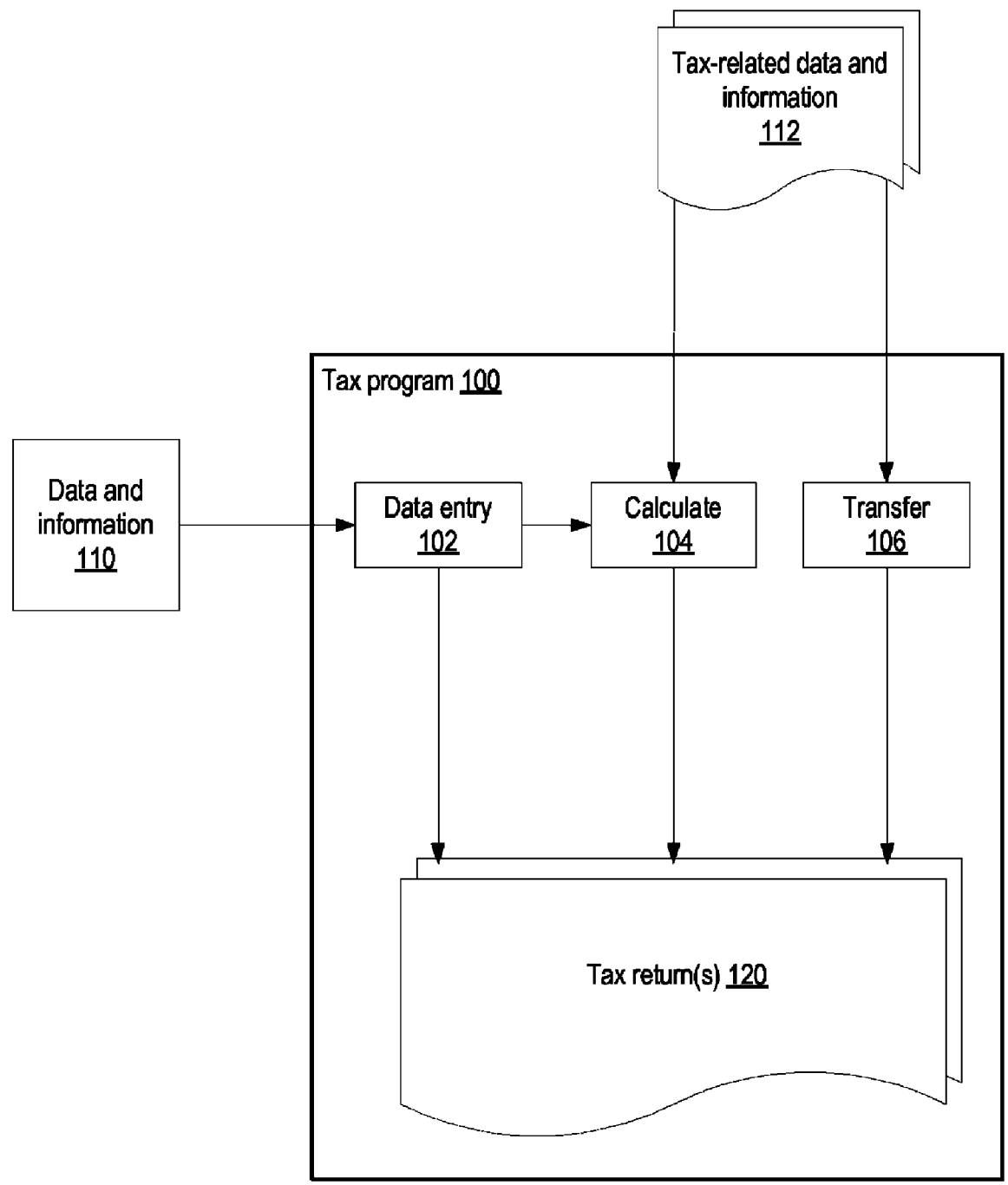
FIG. 1 illustrates the preparation of tax returns using a tax program according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for variable help content and abandonment intervention based on customer behavior in computer software applications, including but not limited to tax preparation software programs (hereinafter referred to as tax programs) are described. In embodiments, a pattern detection and intervention mechanism may be provided that may collect usage and possibly other data for a plurality of users of the computer application and analyze the usage data to determine usage patterns common among the users (including normal usage patterns and/or abnormal usage patterns). The collected data and determined usage patterns may then be used by the pattern detection and intervention mechanism to look for and detect deviations from expected behavior for users of the computer application and/or matches to abnormal usage patterns. The pattern detection and intervention mechanism may provide one or more methods of intervention to provide context-specific help or otherwise assist particular users for which deviations from expected behavior are detected. The intervention methods may range from passive mechanisms (e.g., displaying additional help for a problem area), to mechanisms that may require some initiation of action on the user's part (e.g., providing the user with a phone number to call or web site to visit for additional support), to proactive actions initiated by the computer application vendor, such as a phone call, email, or instant message initiated from the vendor's support system to the user. An example of such a computer application is a tax preparation program.

Rather than simply logging customer feedback and fixing problems detected thereby in future releases of tax programs, as may be done conventionally by tax program vendors, embodiments of the pattern detection and intervention mechanism may enable vendors of tax programs to recognize warning signs indicating that users are having difficulties in the vendors' current tax programs, and may provide automated intervention mechanisms that proactively address the users' problems as they arise, which may help lower frustration that may be caused by use of the tax program. This may provide benefits to the vendors by helping to retain current customers with the tax program vendor when purchasing future releases or updates of the tax program. Embodiments of the pattern detection and intervention mechanism may also benefit the customers by detecting the customers' problems in real- or near-real-time, and intervening to provide passive or proactive assistance to the customers, which may reduce the customers' level of frustration and may allow the customers to continue in the preparation of and successful completion of their tax documents and tax returns in a timely manner.

While embodiments of the pattern detection and intervention mechanism are generally described herein in reference to tax preparation software programs, embodiments of the pattern detection and intervention mechanism may be implemented for other types of computer-implemented processes, programs, and applications (which may be collectively identified as computer applications), including but not limited to other types of financial software programs. Thus, tax programs are used as an example herein, and it is to be understood that the Figures and discussions using tax programs as examples are intended to apply to other types of software programs, including but not limited to other types of financial software programs.

FIG. 1 illustrates the preparation of tax returns using a tax program according to one embodiment. Tax program 100 may be a personal or professional version. Professional versions may be used by tax preparation professionals to prepare various tax returns for multiple customers. Tax program 100 may be configured to guide the tax preparer through income, property, sales, or other type of tax return processes for a tax authority (e.g., a Federal, State, county, city, district, or other municipality tax authority) step-by-step, and may automatically perform necessary tax preparations in accordance with data input, forms, schedules, tax-related data, tables, and formulas stored with or coded into the program.

Figure 12:
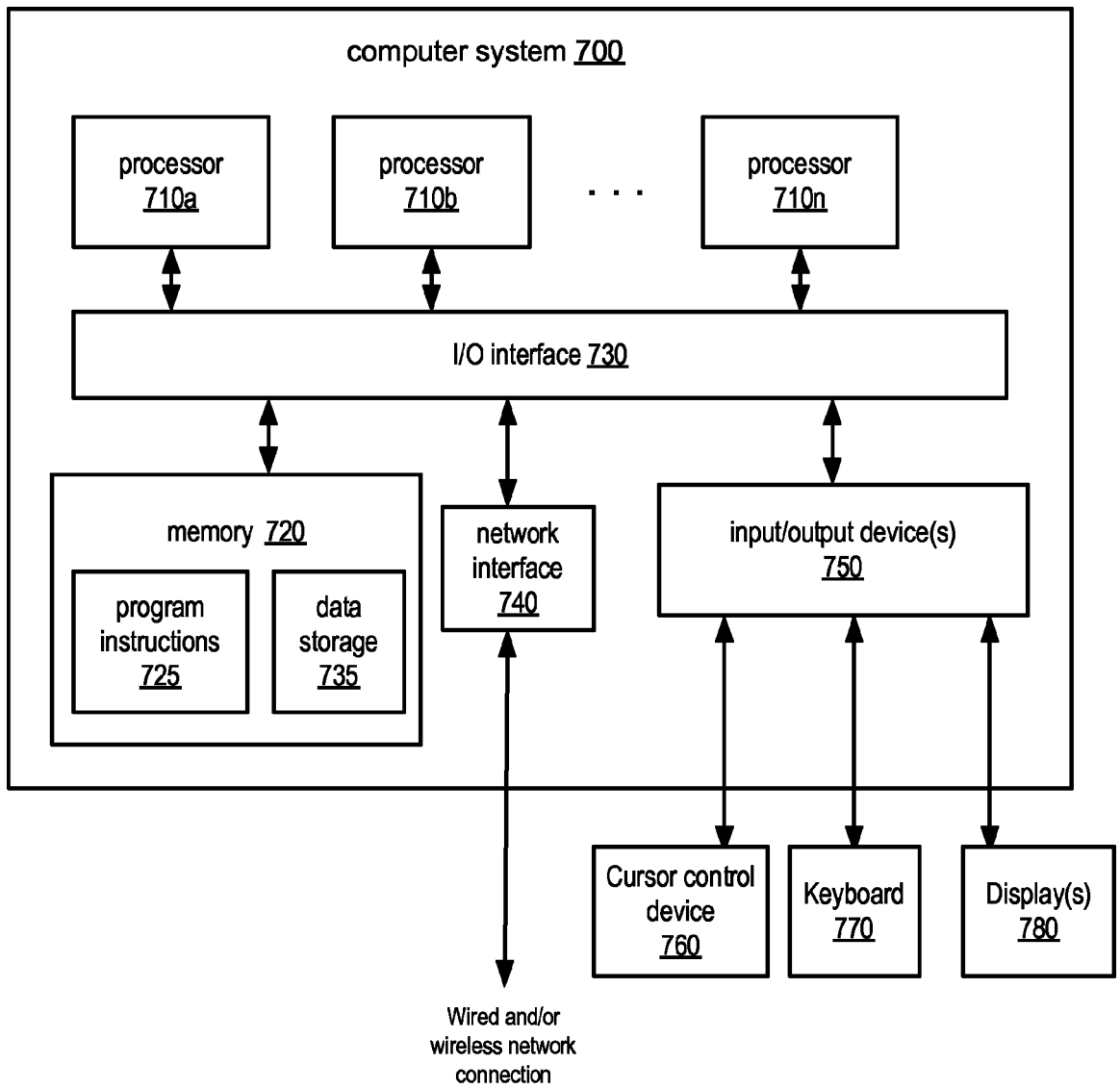
FIG. 12 illustrates an exemplary computer system on which embodiments may be implemented.

An instance of tax program 100 may be installed and executed on a computer system. The computer system may typically be, but is not limited to, a personal computer (PC) such as a desktop computer, laptop, notebook computer, mobile phone, TV set-top boxes, PDA, or other computing device. An exemplary computer system on which an instance of tax program 100 may be implemented is illustrated in FIG. 12. Alternatively, tax program 100 may be a network- or web-based tax return preparation program which a preparer may access (e.g., via a web browser or other application on the preparer's local computer system) to prepare various tax forms via a network connection to a remote computer system (e.g., a server), without necessarily installing a tax program on the local computer system.

A preparer may access or execute tax program 100 to prepare a tax return for a taxable entity. The taxable entity may be the preparer, or may be another taxable entity for which the preparer is preparing the tax return. Note that the taxable entity may be a person, a business, or other entity for which a tax return is to be prepared. Further, the taxable entity may represent two persons that file joint tax returns. The tax return may be a current tax return being prepared for filing for a current tax period, a previously filed tax return being amended, or a tax return being prepared in advance for a future tax period.

Tax program 100 may provide a user interface to guide or step the preparer in the preparation of one or more tax returns 120. Different areas for preparing tax returns for different tax authorities may be identified as different modules in tax program 100. A tax return under preparation may be associated with a particular module (e.g., 1040 federal returns, individual state returns, 1120 federal, corporate state returns, etc.) in the tax program. Thus, tax program 100 may provide a user interface that allows the preparer to select an appropriate module from among two or more modules for preparing a tax return for filing with a particular tax authority.

Tax programs typically include tax documents—the various forms, schedules, worksheets, data entry displays, etc. needed to prepare and file tax returns 120. For example, Federal tax return forms that may be provided may include, but are not limited to, 1040, 1040A, 1040EZ, 1040NR, and 1040X forms. As another example, various tax forms and schedules for various States or other municipalities may be included. In some implementations, these tax documents may be graphically presented by the tax program to the tax preparer on a display device (e.g., a computer monitor or screen of a hand-held device such as a PDA). Typically, a tax program will provide a data entry mechanism 102 via a user interface with various user interface elements (menus, dialog boxes, etc.) and user-selectable interface items (menu items, buttons, controls, text entry boxes, etc.) whereby the preparer may access the documents as needed and enter or modify data on the various tax documents using one or more data entry/cursor control mechanisms, such as a keyboard and mouse. These documents may be presented on the user interface as templates that, when partially or completely filled out, may be "saved" for the particular taxable entity for which the documents are prepared.

In addition, one or more of the values from previous tax return information and/or from other sources or documents may be transferred 106 into or used in the calculation 104 of values for fields of the electronic tax documents. Further, values from a field or fields on one or more electronic tax documents may be transferred 106 to other electronic tax documents. For example, a calculated value from a worksheet or form may be transferred into or used in the calculation of a field on another electronic tax document.

Instead of or as an alternative to entering the necessary data and information directly to the electronic tax documents (e.g., directly to a 1040 form), some implementations of tax program 100 may provide an input mechanism whereby the user inputs necessary data and information into input fields on data entry displays presented to the user by tax program 100 as electronic tax documents. Note that data and/or information from other sources, which may include but is not limited to data and/or information from a previous tax return, from other data entry displays, or from other electronic tax documents related to the preparation of the tax return 120 under preparation, may be transferred into or used in the calculation of values for some fields in the data entry displays. Data and information from the data entry displays may then be automatically transferred into the appropriate locations on electronic tax return documents (e.g., onto an electronic 1040 form) and/or onto other data entry displays. The tax program 100 may perform any necessary calculations using the data and information from the data entry displays, and possibly data and information from other sources such as previous tax returns, to generate appropriate calculated values for certain fields of the tax return documents.

In addition to preparer-entered or transferred values, tax program 100 may perform various calculations to generate values for some fields in electronic tax documents. Note that inputs to a particular calculation to generate a value for a field may include one or more values from one or more sources. One or more data values entered by the preparer via the data entry user interface may be used in calculations to generate new values from some fields in electronic tax documents. In some cases, one or more values from previous tax return information may be used in calculations to generate new values for some fields. Calculated values or values from fields on electronic tax documents may be used as input into other calculations. Also note that some values used in calculations may be coded as "constants" into the tax program, or alternatively may be read into the tax program from a stored data file as needed.

Typically, the tax preparer will enter necessary data and information via the user interface of the tax program 100, and, when done, access the user interface to direct the tax program 100 to complete the tax return 120 under preparation. The tax program 100 may perform any necessary calculations using the entered data and information and in accordance with tax formulas relevant to the particular tax return 120 under preparation, and possibly data and information from other sources such as previous tax returns or other tax-related documents, to generate appropriate calculated values for certain fields of the tax return 120 under preparation.

The completed tax return 120 may indicate that the taxable entity owes taxes to the tax authority or that the taxable entity is owed a tax refund from the tax authority. The tax return 120 may then be filed with the tax authority. For example, the electronic tax document(s) of the tax return may be electronically transmitted to the tax authority. Alternatively, the tax document(s) may be printed and mailed or otherwise delivered to the tax authority. If taxes are due, the tax amount may be paid to the tax authority by the taxable entity at the time of filing or, in some cases, may be deferred. The tax payment may be transferred electronically from an account (e.g., a bank account or credit card account) of the taxable entity (i.e., and electronic funds transfer (EFT)) or alternatively may be paid by check. If a refund is due, the refund amount may be paid to the taxable entity by the tax authority either electronically to an account (e.g., a bank account) of the taxable entity or by check.

Note that instances of tax program 100 may be installed and executed on many computer systems and used by many tax preparers (also referred to as "users") to prepare various tax documents and tax returns. The number of instances and users (tax preparers) may be in the thousands or even millions. Alternatively, tax program 100 may be a network- or web-based tax return preparation program which many users may access (e.g., via web browsers or other applications on the users' local computer systems) to prepare various tax forms via network connections to one or more remote computer systems (e.g., servers), without necessarily installing a tax program on the local computer systems. Again, the number of users (tax preparers) may be in the thousands or even millions.

Embodiments of the pattern detection and intervention mechanism may collect usage and possibly other data for the tax program for a subset or even all of the users of the tax program 100. The collected usage data may include one or more of, but is not limited to, repetitive actions (e.g., going back and forth between two screens or two items on one screen), frequency of clicking, the time it takes the users to perform certain actions (e.g., how long do users spend on a particular screen or area?), the sequences that the users follow to perform particular tasks (including subtasks such as preparing a particular document or field in a document and the overall task of preparing a tax return), and so on. Note that user data related to the individual users may also be collected. Further note that previous tax documents and tax returns may be collected and stored. In one embodiment, information that may be used to identify particular taxable entities may be filtered to protect the privacy of the individual taxable entities.

If tax program 100 is a network- or web-based tax return preparation program, the usage data may be collected by the pattern detection and intervention mechanism directly, and possibly in real-time or near-real time, on the server(s) that are accessed by the users. If tax program 100 is a stand-alone program installed and executed on the users' computer systems, the usage data may be collected in real-time or near-real-time remotely over a network by the pattern detection and intervention mechanism, or alternatively may be collected and stored locally on the users' computer systems, and then uploaded to the pattern detection and intervention mechanism, for example on a server, via a network. Note that, in one embodiment, the pattern detection and intervention mechanism may first seek a users' permission before uploading or otherwise obtaining a user's usage (or other) information.

The pattern detection and intervention mechanism may analyze the collected data using one or more statistical or other data analysis techniques to determine usage patterns common among the users of the tax program 100, including normal usage patterns and possibly abnormal usage patterns. A normal usage pattern may be a pattern that is statistically the pattern of interactions with tax program 100 that a user may go through to prepare a particular tax document or tax return. An abnormal usage pattern may be a pattern that indicates a user may be having difficulty in a particular area of the tax program 100 or with the tax program 100 in general.

The collected data and determined usage patterns may then be used by the pattern detection and intervention mechanism to look for and detect deviations from expected behavior for individual users of the tax program 100 using one or more statistical or other data analysis techniques. For example, a normal usage pattern for a particular tax document may be used to detect a deviation of the pattern by a particular user of the program. The pattern detection and intervention mechanism may track the user's actions when attempting to prepare the tax document, correlate those actions with the expected pattern of behavior when successfully preparing the tax document as determined from analysis of collected usage information for a plurality of users, and may detect significant deviation from the expected pattern if such a deviation occurs. Alternatively, or in addition the pattern detection and intervention mechanism may follow the user's actions when attempting to prepare the tax document, correlate those actions with abnormal patterns of behavior when preparing the tax document as determined from analysis of collected usage information for a plurality of users, and may thus detect if the user is following an abnormal pattern that indicates that the user is having problems with the tax document under preparation.

In one embodiment, thresholds may be provided for deviations from the normal or expected patterns of behavior for various aspects or areas of the tax program 100, and if a user's detected pattern of behavior exceeds the threshold for the current aspect or area of the tax program 100 that the user is currently working on or in, then the pattern detection and intervention mechanism may intervene by initiating a response to the user. Note that each expected pattern of behavior may be assigned a threshold, or alternatively one threshold may be provided for all expected patterns of behavior, or as another alternative different thresholds may be provided for different areas of the tax program that each may incorporate one or more expected patterns of behavior.

The pattern detection and intervention mechanism may provide one or more methods of intervention to provide context-specific help or to otherwise assist particular users for which deviations from expected behavior (or abnormal patterns of behavior) are detected. The intervention methods may range from passive mechanisms (e.g., displaying a help interface for the tax program, or providing additional help or information directed at the particular problem area), to mechanisms that may require some initiation of action on the user's part (e.g., providing the user with a phone number to call or web site to visit to obtain additional support), to proactive actions initiated from the tax program vendor, such as a phone call, email, or instant message initiated from the vendor's support system to the user in response to a notification by the pattern detection and intervention mechanism that the particular user may be having difficulty in a particular area of the tax program 100.

In one embodiment, the pattern detection and intervention mechanism may initiate a response that asks the user if the user would like the tax program to automatically fill in (or provide suggested content for) one or more items on a document under preparation for which the user appears to be experiencing difficulties. In one embodiment, if the pattern detection and intervention mechanism detects that the user is having difficulties with a complex form or document, the pattern detection and intervention mechanism may initiate a response that presents a simplified version of the document or form to the user. For example, the pattern detection and intervention mechanism response may break up the form into separate parts, and present each part to the user on a simplified screen with possibly additional information about the particular part. As another example, the pattern detection and intervention mechanism response may present at least a portion of a form or document to the user in a more visual, graphical format that may be easier for the user to understand and use rather than in a standard, more text-oriented format.

In one embodiment, a pattern detection and intervention mechanism response may be to provide specific help content based on the user's specific detected actions or behavior. For example, the pattern detection and intervention mechanism may identify a specific pattern in the usage data collected from the users that indicates how at least some customers interact with the tax program 100 when looking for where to enter a 1099-G form. If, after statistically determining the pattern from usage data collected from many users, the pattern detection and intervention mechanism recognizes that pattern in the interactions of a particular user with the tax program, the pattern detection and intervention mechanism may initiate a response that pops up the help application and asks the user if they are looking for the 1099-G form. Note that the 1099-G form is given by way of example; the pattern detection and intervention mechanism may identify other patterns from the usage data collected from the users and may provide responses particular to each identified pattern.

Figure 2:
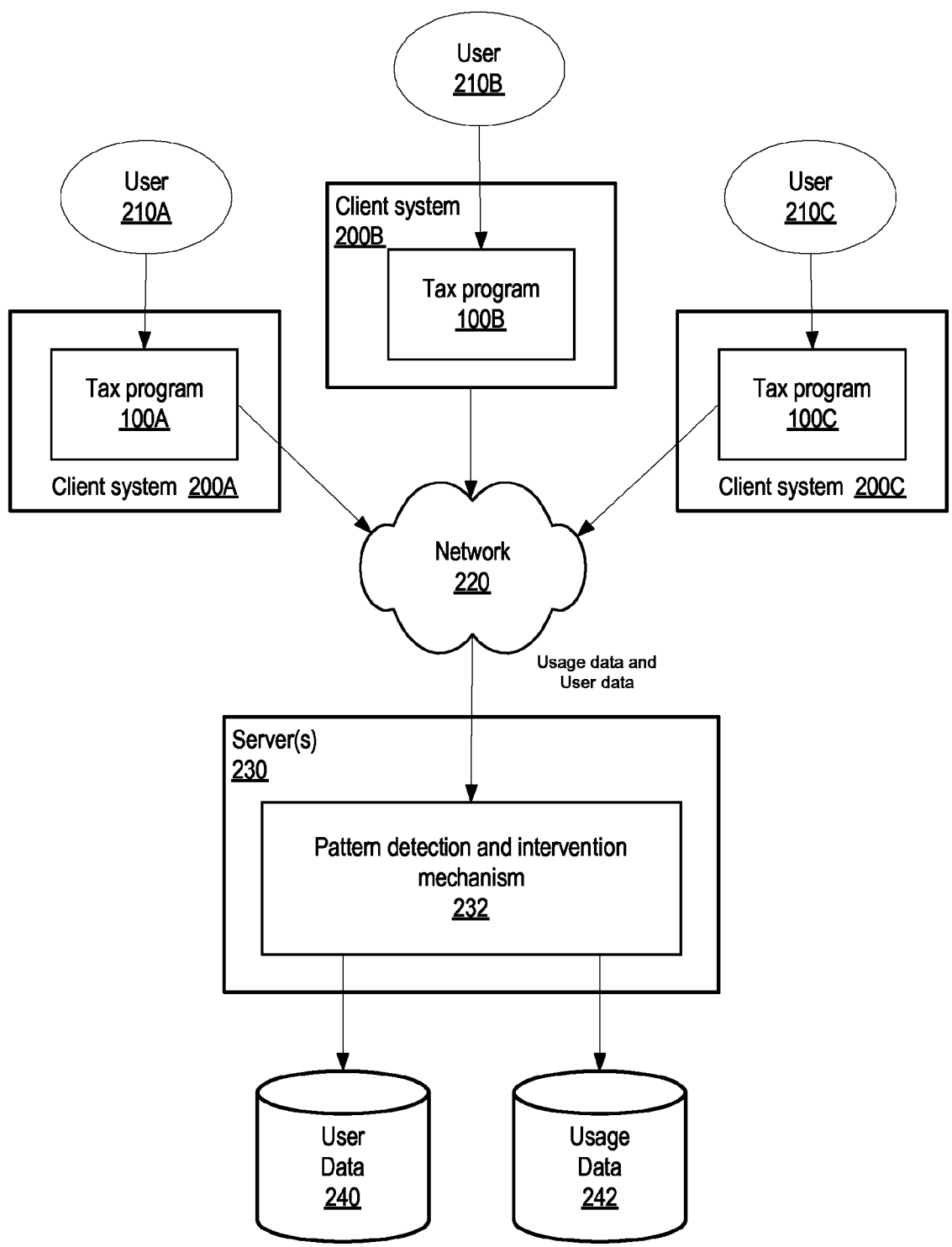
FIG. 2 illustrates the collection of usage data and possibly other information from users of a tax program by a pattern detection and intervention mechanism according to one embodiment.

FIG. 2 illustrates the collection of usage data and possibly other information from users of a tax program by a pattern detection and intervention mechanism according to one embodiment. FIG. 2 shows three client systems 200 coupled to server(s) 230 via a network 220, and a corresponding user 210 for each client system 200. Each client system 200 includes an instance of tax program 100. Note that, while three client systems 200 and users 210 are shown in this example, instances of tax program 100 may be installed and executed on any number of client systems 100, which may be coupled to network 220. Alternatively, tax program 100 may be a network- or web-based tax return preparation program which users may access (e.g., via web browsers or other applications on the client systems 200) to prepare various tax forms via network connections to one or more remote computer systems (e.g., servers), without necessarily installing a tax program 100 on the local client systems 200. Again, the number of client systems 200 and users 210 may be in the thousands or even millions.

An embodiment of the pattern detection and intervention mechanism 232 on server(s) 230 may collect usage data 242 and possibly other data for the tax program 100 from a subset or even all of the instances of tax program 100 on client systems 200. The collected usage data 242 may include one or more of, but is not limited to, repetitive actions (e.g., going back and forth between two screens or two items on one screen), frequency of clicking, the time it takes the users 210 to perform certain actions (e.g., how long do users 210 tend to spend on a particular screen or area?), the sequences that the users 210 follow to perform particular tasks (including subtasks such as preparing a particular document or field in a document and the overall task of preparing a tax return), and so on. Note that user data 240 related to the individual users 210 may also be collected. For example, previous tax documents and tax returns for users 210 may be collected and stored, and associated with the corresponding users. Note, however, that in one embodiment, information that may be used to identify particular taxable entities may be filtered, blocked, or encrypted to protect the privacy of the individual taxable entities.

If tax program 100 is a network- or web-based tax return preparation program, the usage data 242 may be collected by the pattern detection and intervention mechanism 232 directly, and possibly in real-time or near-real time, from the server(s) that are accessed by the users of tax program 100. If tax program 100 is a stand-alone program installed and executed on the client systems 200, as is illustrated in FIG. 2, the usage data 242 may be collected in real-time or near-real-time remotely over network 220 by pattern detection and intervention mechanism 232, or alternatively may be collected and stored locally on the client systems 200, and then uploaded to pattern detection and intervention mechanism 232 via network 220. In some embodiments, the usage data may be collected via peer-to-peer networking Note that, in one embodiment, pattern detection and intervention mechanism 232 may first seek a users' permission before uploading or otherwise obtaining a user's usage (or other) data.

Figure 3:
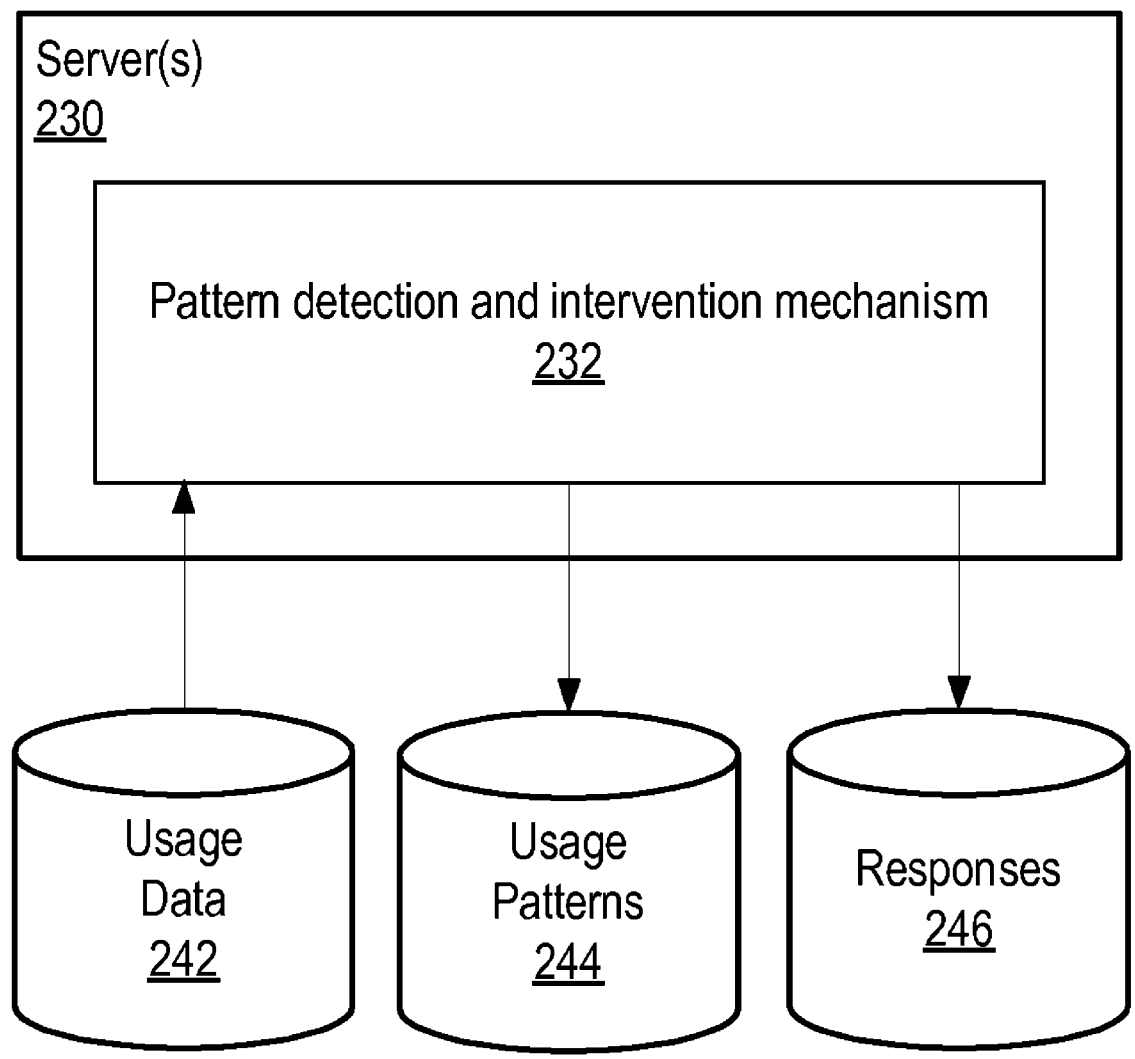
FIG. 3 illustrates the analysis of collected data by a pattern detection and intervention mechanism according to one embodiment.

FIG. 3 illustrates the analysis of collected usage and other data by a pattern detection and intervention mechanism according to one embodiment. The collected data may include, but is not limited to, usage data 242 and user data 240. The pattern detection and intervention mechanism 232 may analyze the collected data according to one or more statistical or other data analysis techniques to determine usage patterns 244 common among the users 210 of the tax program 100, including normal usage patterns and possibly abnormal usage patterns. A normal usage pattern may be a pattern that is statistically the pattern of interactions with tax program 100 that a user 210 typically follows to prepare a particular tax document or tax return. An abnormal usage pattern may be a pattern that indicates a user 210 may be having difficulty in a particular area of the tax program 100 or with the tax program 100 in general. For example, pattern detection and intervention mechanism 232 may detect a usage pattern among a subset of users 210 on a particular screen that differs from the "normal" usage pattern for that screen. For example, the detected abnormal pattern may be that the subset of users 210 tends to go back and forth between items on the screen, and do not actually complete the screen.

After determining usage patterns 244, responses 246 for deviations from some or all of the detected usage patterns 244 may be manually and/or automatically generated. Each detected usage pattern 244 may have zero, one, or more associated responses 246. Note that usage patterns 244 are associated with particular aspects of tax program 100, such as particular forms, documents, or fields presented to users 210 by tax program 100. Responses 246 are further described below, for example in the discussion of FIG. 5.

The collected user data 240, usage data 242, and/or determined usage patterns 244 may then be used by the pattern detection and intervention mechanism 232 to look for and detect deviations from expected behavior for particular users 210 of the tax program 100 in real-time or near-real-time using one or more statistical or other data analysis techniques. When a deviation from expected behavior is detected for a particular user 210, the pattern detection and intervention mechanism 232 may intervene by initiating one or more responses 246 associated with the usage pattern 244 from which the user 210 has deviated.

Figure 4:
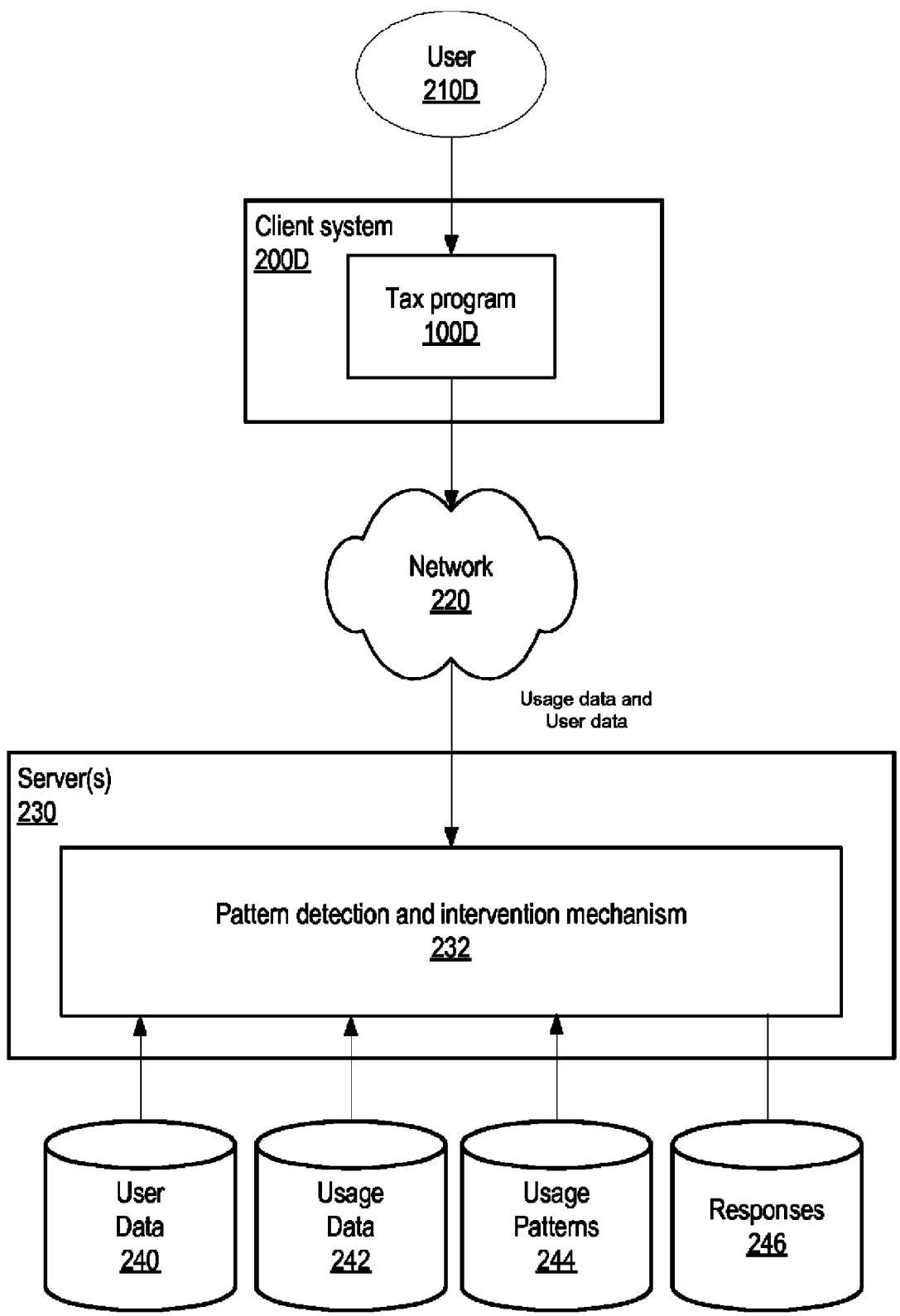
FIG. 4 illustrates the collection of usage data for a particular user, and the analysis of the usage data to look for patterns that may indicate deviations from expected behavior, by a pattern detection and intervention mechanism according to one embodiment.

FIG. 4 illustrates the collection of usage data for a particular user of the tax program, and the analysis of the collected usage data for the user to look for patterns that may indicate deviations from expected behavior by the user, by a pattern detection and intervention mechanism according to one embodiment. FIG. 4 shows a client system 200D coupled to server(s) 230 via a network 220, and a corresponding user 210D of tax program instance 100D on client system 200D. Note that, while one client system 200D and user 210D are shown in this example, pattern detection and intervention mechanism may collect usage data from two or more client systems 200 concurrently. Further note that, while the example in FIG. 4 shows an instance of tax program 100 (tax program 100D) installed on client system 200D, in one embodiment, tax program 100 may be a network- or web-based tax return preparation program which user 210D may access (e.g., via web browsers or other applications on the client system 200D) to prepare various tax forms via a network connection to one or more remote computer systems (e.g., servers), without necessarily installing a tax program 100 on the local client systems 200D.

An embodiment of the pattern detection and intervention mechanism 232 on server(s) 230 may collect usage data and possibly other data for an interactive session of user 212D with tax program 100D instance on client systems 200D in real-time or near-real-time. The collected usage data may indicate the user 210D's interactions with the tax program 100D's user interface. The collected usage data may include one or more of, but is not limited to, keystrokes, user interface item or element selections (e.g., the selection of screens, buttons, text or numeric fields, menus, menu items, tabs, and so on, typically but not necessarily made using a cursor control device), cursor location information (e.g., information indicating that the cursor is hovering over a particular user interface element), timing information (e.g., the time the user 210D spends on a particular field of a displayed screen). The collected usage data for user 210D may indicate or may be used to determine repetitive actions (e.g., going back and forth between two screens or two items on one screen), frequency of clicking, the time it takes the user 210D to perform certain actions (e.g., how long does user 210D spend on a particular screen or area?), the sequences that the user 210D follows to perform particular tasks (including subtasks such as preparing a particular document or field in a document and the overall task of preparing a tax return), and so on. Note that user data related to the individual user 210D may also be collected, and may be correlated with previous user data collected for user 210D and stored in user data 240. For example, previous tax documents and tax returns, and possibly even previous usage data, for user 210D may be stored in user data 240. Note, however, that in one embodiment, information that may be used to identify the particular taxable entity may be filtered, blocked, or encrypted to protect the privacy of the taxable entity.

If tax program 100 is a network- or web-based tax return preparation program, the usage data for user 210D may be collected by the pattern detection and intervention mechanism 232 directly, and possibly in real-time or near-real time, from the server(s) on which tax program 100 resides and that are accessed by the user 210D to use the tax program 100. If tax program 100D is a stand-alone program installed and executed on the client system 200D, as is illustrated in FIG. 4, the usage data may be collected in real-time or near-real-time remotely over network 220 by pattern detection and intervention mechanism 232. Note that tax program 100D may be configured to provide usage data to pattern detection and intervention mechanism 232 in real-time or near-real-time via network 220 as the user 210D interacts with the user interface of the program 100D. Alternatively, usage data may be collected and stored locally on client systems 200D, and periodically or aperiodically uploaded to pattern detection and intervention mechanism 232 via network 220.

Note that, in one embodiment, pattern detection and intervention mechanism 232 may first seek permission from user 210D before uploading or otherwise obtaining the user's real-time usage data or other user data, or alternatively permission to monitor user 210D's usage of tax program 100D in real-time may otherwise be obtained, for example as part of an initial licensing agreement accepted by user 210D when installing tax program 210D on client system 200D.

The usage data collected from tax program 110D may then be used by the pattern detection and intervention mechanism 232 to look for and detect deviations from expected behavior by user 210D of tax program 100D and according to usage patterns 244 through the application of or more statistical or other data analysis techniques. For example, a normal usage pattern or patterns for filling out a particular tax document according to usage patterns 244 may be used to look deviation from the pattern(s) by user 210D when attempting to fill out the tax document. The pattern detection and intervention mechanism 232 may track user 210D's interactions with the user interface presented by tax program 110D when attempting to prepare the tax document and correlate those interactions with the expected pattern(s) of behavior for preparing the tax document according to usage patterns 244 as determined from previous analysis of collected usage data for a plurality of users. Pattern detection and intervention mechanism 232 may detect a significant deviation from the expected pattern(s) if such a deviation occurs. Alternatively, or in addition the pattern detection and intervention mechanism 232 may follow the user 210D's interactions when attempting to prepare the tax document, correlate those interactions with abnormal patterns of behavior when preparing the tax document according to usage patterns 244, and may thus detect if user 210D is following an abnormal pattern that indicates that the user 210D is having problems preparing the tax document. In either case, if pattern detection and intervention mechanism 232 detects that the user 210D is having difficulties with the tax document, pattern detection and intervention mechanism 232 may intervene by initiating a response to the user.

In one embodiment, thresholds may be provided for deviations from the normal or expected patterns of behavior for various aspects or areas of the tax program 100D, and if user 210D's deviation from the normal pattern of behavior exceeds the threshold for the current aspect or area of tax program 100D that the user 210D is currently working on or in, then the pattern detection and intervention mechanism 232 may intervene by initiating a response to the user. Note that each expected pattern of behavior may be assigned a threshold, or alternatively one threshold may be provided for all expected patterns of behavior, or as another alternative different thresholds may be provided for different areas of the tax program that each may incorporate one or more expected patterns of behavior.

Figure 5:
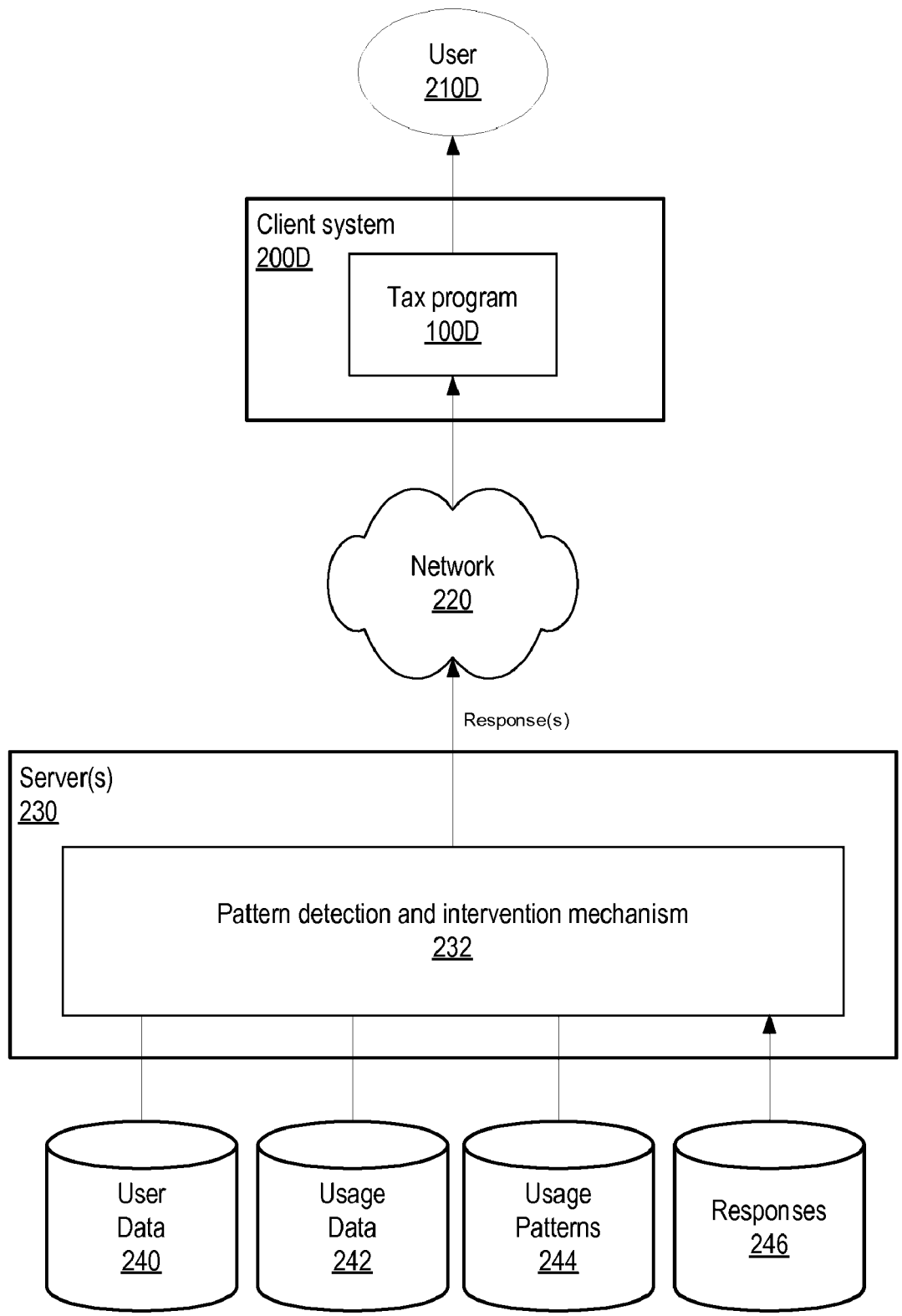
FIG. 5 illustrates responding to detected deviations from expected behavior by pattern detection and intervention mechanism according to one embodiment.

FIG. 5 illustrates a pattern detection and intervention mechanism responding to a detected deviation from expected behavior according to one embodiment. Pattern detection and intervention mechanism 232 may provide one or more methods or mechanisms of intervention (responses 246) to provide context-specific help or to otherwise assist particular users for which deviations from expected behavior (or abnormal patterns of behavior) are detected. The responses 246 may range from passive mechanisms (e.g., displaying a help interface for the tax program, or providing additional help or information specific to the particular aspect of tax program 100 that the user 210 is having difficulty with), to mechanisms that may require some initiation of action on the user 210's part (e.g., providing the user 210 with a phone number to call or URL of a web site to visit to obtain additional support), to proactive interventions that may be initiated by the tax program vendor, such as a phone call, email, or instant message initiated from the vendor's support system to the user in response to a notification by pattern detection and intervention mechanism 232 that the particular user 210D may be having difficulty in a particular area of the tax program 100D.

In one embodiment, pattern detection and intervention mechanism 232 may initiate a response 246 that prompts the user 210D via client system 200D to ask if the user 210D would like the tax program to automatically fill in (or provide suggested content for) one or more items on the tax document under preparation for which the user 210D appears to be experiencing difficulties. In one embodiment, if pattern detection and intervention mechanism 232 detects that the user 210D is having difficulties with a complex form or document, pattern detection and intervention mechanism 232 may initiate a response 246 that presents a simplified version of the document or form to the user 210D. For example, a pattern detection and intervention mechanism 232 response 246 may cause tax program 100D to break up the document or form into separate parts and present each part to the user 210D as a simplified screen with possibly additional information about the particular part. As another example, pattern detection and intervention mechanism 232 may initiate a response 246 that may cause tax program 100D to present at least a portion of a form or document to the user 210D in a more visual, graphical format that may be easier for the user 210D to understand rather than in a standard, more text-oriented format.

In one embodiment, a pattern detection and intervention mechanism 232 response 246 may be to provide specific help content based on the user 210D's specific detected actions or behavior. For example, pattern detection and intervention mechanism 232 may identify a specific pattern in the usage data collected from users 210 that indicates how at least some users interact with the tax program 100 when looking for where to enter a 1099-G form. If, after statistically determining the pattern from usage data collected from many users 210, the pattern detection and intervention mechanism 232 recognizes that pattern in the interactions of user 210D with the tax program, the pattern detection and intervention mechanism 232 may initiate a response 246 that pops up the help application and asks the user 232 if the user is looking for the 1099-G form. Note that the 1099-G form is given by way of example; the pattern detection and intervention mechanism 232 may identify other patterns for other aspects of tax program 100 from the usage data collected from the users 210 and may provide responses 246 tailored to each identified pattern and the corresponding aspect of tax program 100.

Figure 6:
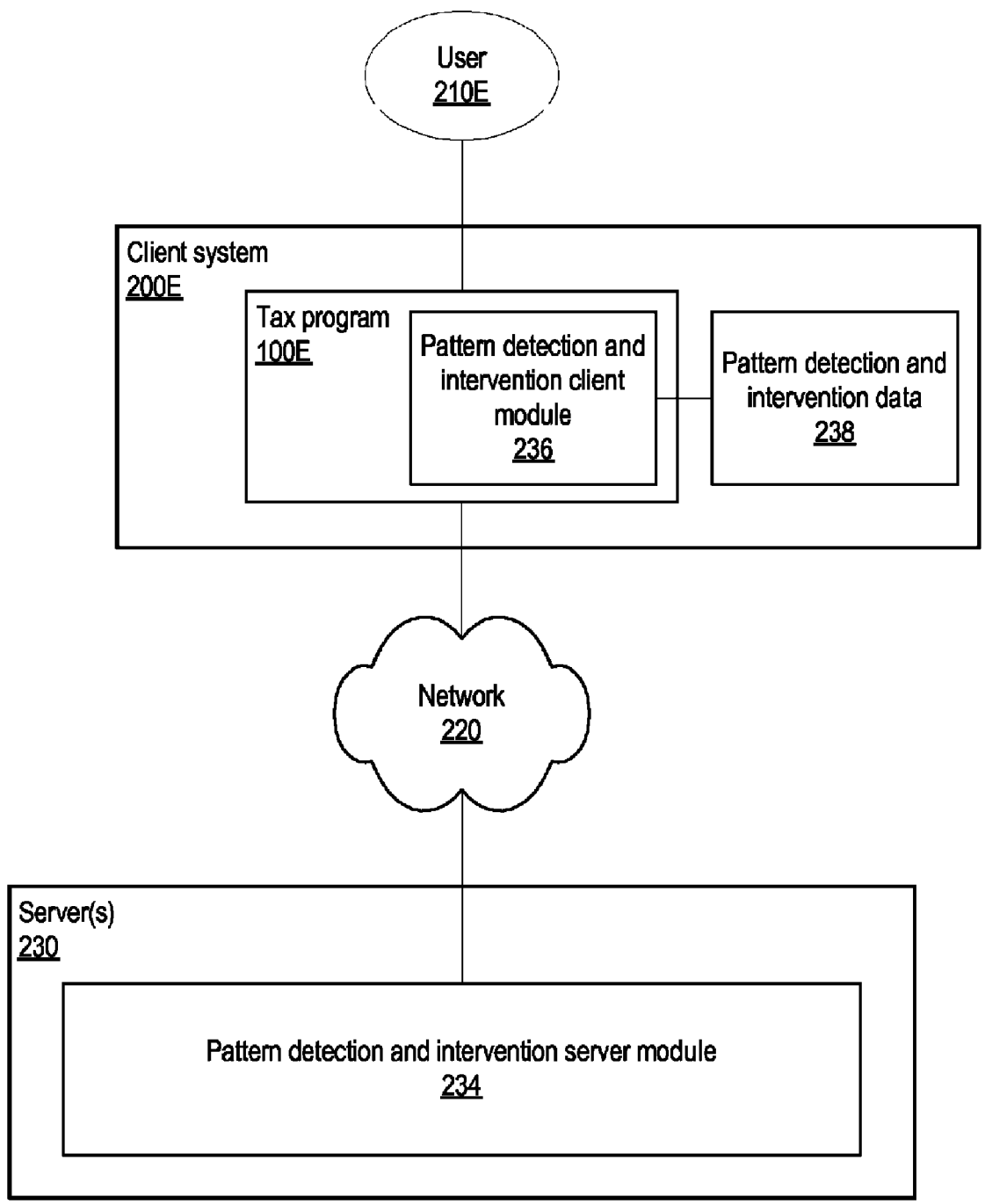
FIG. 6 illustrates a client system including an instance of a tax program that includes a pattern detection and intervention client module and a server system that includes a pattern detection and intervention server module according to one embodiment.

While FIGS. 2 through 5 show pattern detection and intervention mechanism 232 on server(s) 230 and an instance of tax program 100 on a client system 200, in embodiments, a client system 200 and/or an instance of tax program 100 may include software and/or data that implements at least a portion of the pattern detection and intervention mechanism 232 as described herein. FIG. 6 illustrates a client system including an instance of a tax program that includes a pattern detection and intervention client module and a server system that includes a pattern detection and intervention server module according to one embodiment. In this embodiment, for example, pattern detection and intervention server module 234 may collect usage and other data from user interactions of instances of tax program 100 on client systems 200 with the assistance of pattern detection and intervention client modules 234 of tax program 100. Pattern detection and intervention server module 234 may perform the analysis of the collected usage and other data as described in FIG. 3. The analysis may determine usage patterns and criteria for detecting deviations from the usage patterns, and responses to deviations from the usage patterns may be generated and associated with the usage patterns. Pattern detection and intervention server module 234 may generate pattern detection and intervention data 238. Pattern detection and intervention data 238 may include the usage patterns, criteria for detecting deviations from the usage patterns, and responses to deviations from the usage patterns. Pattern detection and intervention data 238 may be installed on or downloaded to client systems 200, such as client system 200E. Pattern detection and intervention client module 236 of tax program 100E may then monitor interactions of user 210E with tax program 100E, and access pattern detection and intervention data 238 to look for deviations from expected behavior that may indicate that user 210E is having difficulties, and if such a deviation is detected, intervene by initiating an appropriate response as indicated by pattern detection and intervention data 238.

User Interface

FIGS. 7 through 10 illustrate exemplary user interfaces that may be presented to a user of a tax program, describes some exemplary user behaviors when relating with the user interface that may be tracked by the pattern detection and intervention mechanism, and provides some examples of possible interventions that may be provided as responses to detected deviations from expected behaviors by the pattern detection and intervention mechanism according to embodiments. Note again that the following is exemplary, and is not intended to be limiting.

Figure 7:
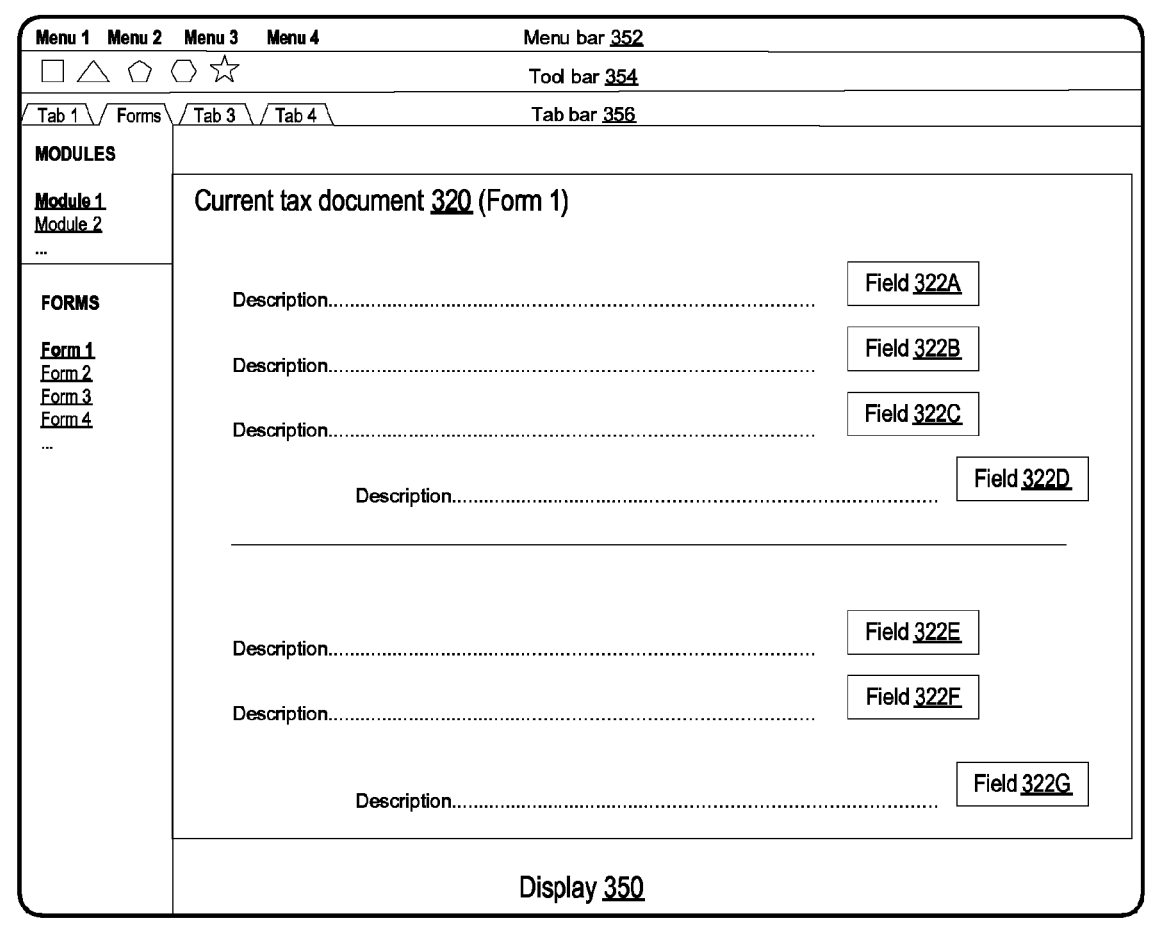

FIG. 7 illustrates an exemplary, generic display and user interface that may be provided by a tax program such as tax program 100 in FIGS. 1 through 6 according to one embodiment. Display 350 may include one or more of, but is not limited to, a menu bar 352, a tool bar 354, and a tab bar 356.

Menu bar 352 may provide one or more menus for accessing various functionalities of tax program 100 via user-selectable interface items (menu selections). Tool bar 354 may provide one or more tool icons for accessing various tools of tax program 100. Tab bar 256 may provide one or more tabs for switching between various views presented to the tax preparer. The currently selected tab displays forms for various modules. The user interface may provide one or more user interface items for selecting among modules and among electronic documents of selected modules. As an example, the Forms tab includes, on the left, a selection area to select a module from a list of modules. Module 1 is shown in bold text to indicate that it is currently selected. The Forms tab may also include a selection area to select a form (electronic document) of a selected module from a list of forms for the module. Form 1 is shown in bold text to indicate that it is currently selected. The Forms tab displays a current tax document 320 (Form 1). Note that these user interface items are exemplary, and that a person skilled in the art will recognize that other user interface mechanisms and items may be used to select among modules and forms. Further note that current tax document 320 is intended to be representative of both tax return documents (e.g., 1040, 1040A, 1040EZ, 1040NR, and 1040X forms of a Federal tax return) presented as templates for data entry by the user and data entry displays that include input fields for entering data and information to be transferred into tax return documents.

Current tax document 320 may include multiple fields 322. These fields 322 may include fields that need to be entered by the preparer via the user interface, fields for which values may be transferred from a previous tax return or from other documents in the current tax return, and/or fields that may include values that need to be calculated. Calculated values may be calculated from one or more other values, including values transferred from a previous tax return, values entered by the preparer via the user interface, and values from other fields 322 or other documents. In some cases, calculated values displayed in one field 322 may be used in calculating a value for another field 322.

An embodiment of the pattern detection and intervention mechanism may track a preparer's interactions with the user interface presented in display 350 and compare those interactions to previously determined expected pattern(s) of user interaction when preparing current tax document 320 (Form 1). If a significant deviation from the expected pattern(s) is detected, the deviation may indicate that the preparer is having trouble completing the tax document. For example, the pattern detection and intervention mechanism may detect that the preparer has jumped back and forth between two of the fields 222 more than an expected number of times, or that the preparer has jumped back and forth between Form 1 and another Form or Forms more than an expected number of times, or that the preparer has hovered the cursor over a field without filling in the field for more than an expected amount of time, or that the preparer has changed the value in a field 222 more than an expected number of times, or that the preparer has accessed the menus in menu bar 352, tabs in tab bar 356, and/or tools in tool bar 354 more than an expected number of times. Note that a combination of different user interactions may be taken to indicate a deviation from expected behavior that indicates that the preparer is having difficulties. As an alternative to detecting a deviation from an expected pattern, a pattern of interactions by the preparer may be detected that matches a known pattern associated with user confusion or difficulty with Form 1 according to previously collected usage information from a plurality of users when preparing Form 1.

The pattern detection and intervention mechanism may provide one or more methods of intervention to provide context-specific help or to otherwise assist particular users for which deviations from expected behavior (or abnormal patterns of behavior) are detected. The intervention methods may range from passive mechanisms (e.g., displaying a help interface for the tax program, or providing additional help or information directed at the particular problem area), to mechanisms that may require some initiation of action on the user's part (e.g., providing the user with a phone number to call or web site to visit to obtain additional support), to proactive actions initiated from the tax program vendor, such as a phone call, email, or instant message initiated from the vendor's support system to the user in response to a notification by the pattern detection and intervention mechanism that the particular user may be having difficulty in a particular area of the tax program 100.

Figure 8:
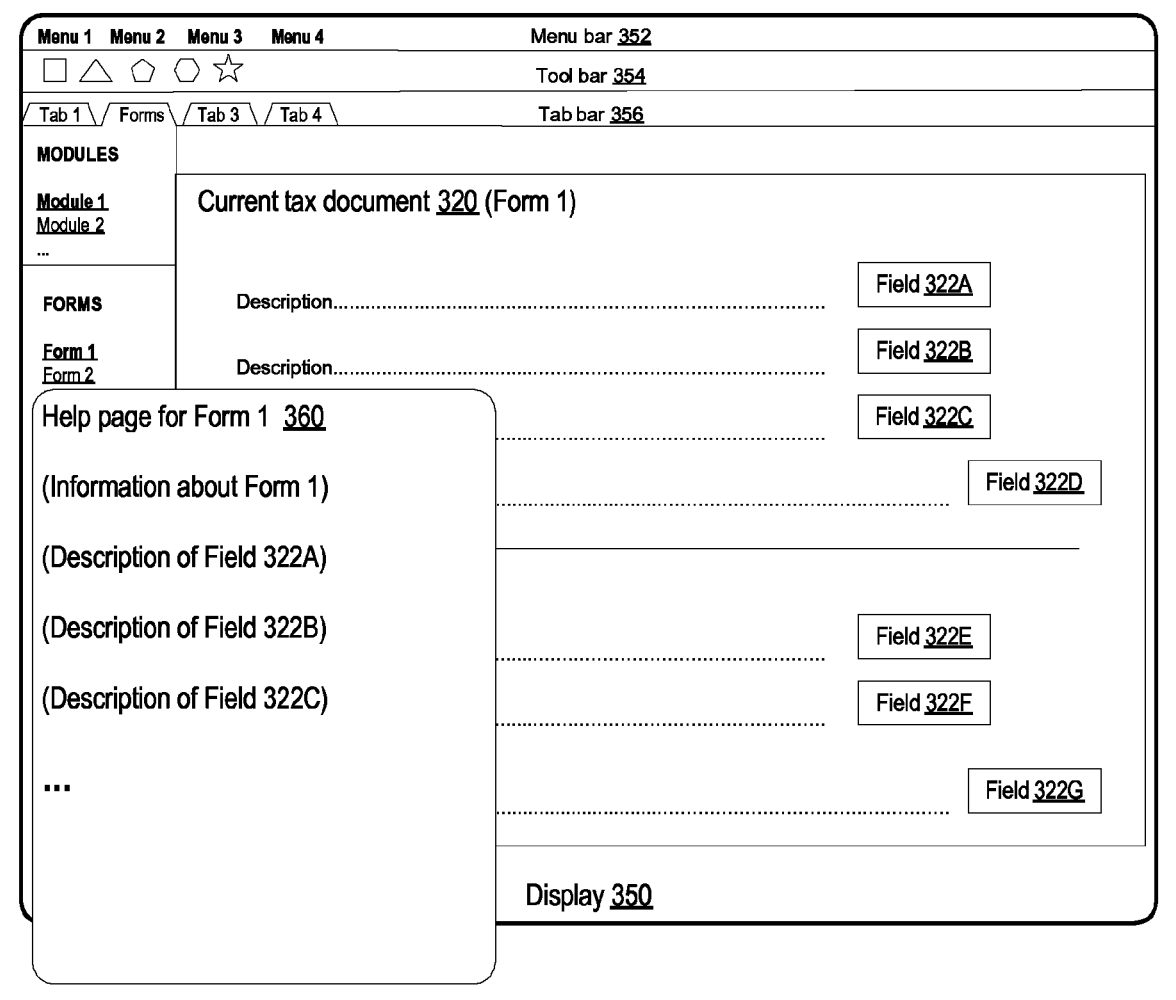
Figure 10:
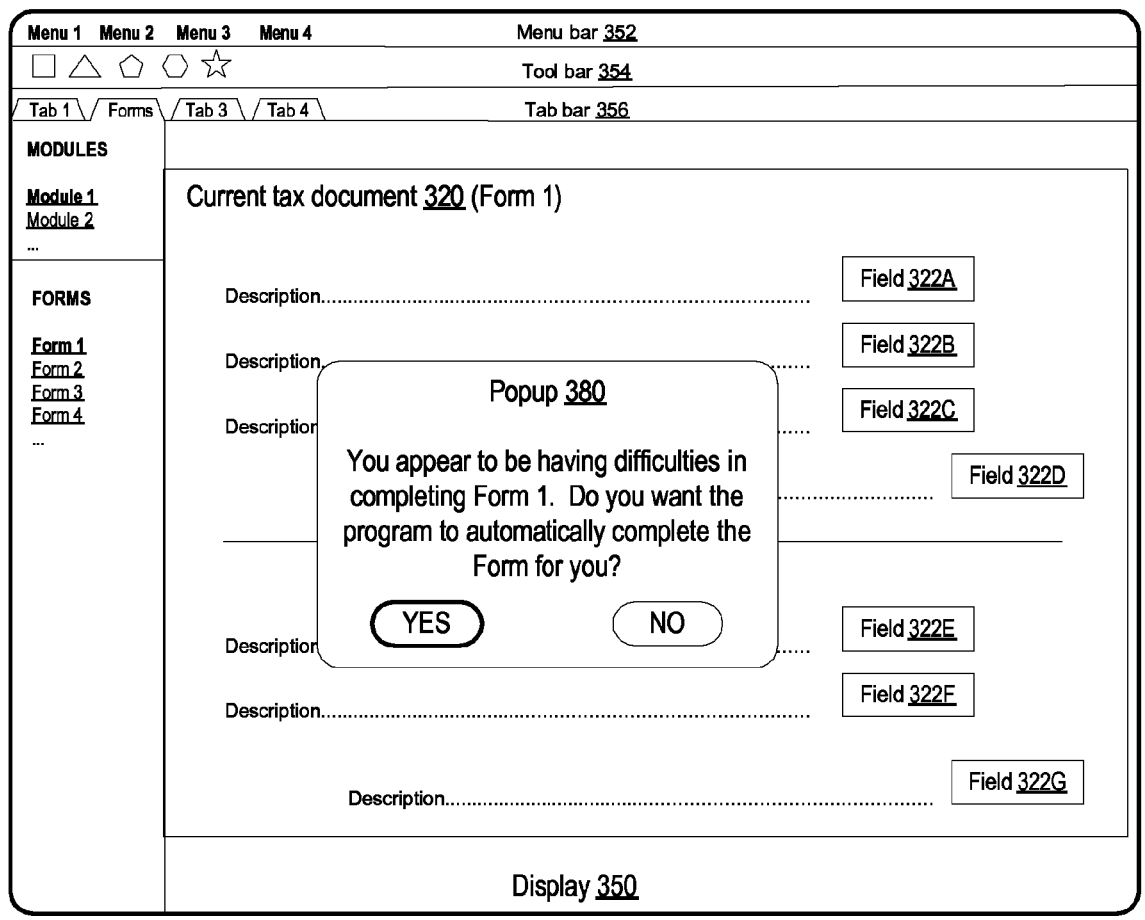
FIG. 10 illustrates an exemplary popup window that may be automatically displayed in response to detecting a deviation from expected behavior or known pattern associated with user confusion or difficulty, according to one embodiment.

FIGS. 8 through 10 illustrate some exemplary methods of intervention that may be initiated in response to detecting a deviation from expected behavior or alternatively to detecting a known pattern associated with user confusion or difficulty. FIG. 8 illustrates an exemplary help page 360 for Form 1 that may be automatically displayed in response to detecting a deviation from expected behavior or known pattern associated with user confusion or difficulty, according to one embodiment. FIG. 9 illustrates an exemplary popup window 370 that may be automatically displayed in response to detecting a deviation from expected behavior or known pattern associated with user confusion or difficulty, according to one embodiment. The popup 370, for example, may provide a phone number that the preparer may call to obtain customer support for Form 1. FIG. 10 illustrates an exemplary popup window 380 that may be automatically displayed in response to detecting a deviation from expected behavior or known pattern associated with user confusion or difficulty, according to one embodiment. The popup 380 may provide the preparer with the option to have the program automatically complete Form 1.

Figure 11:
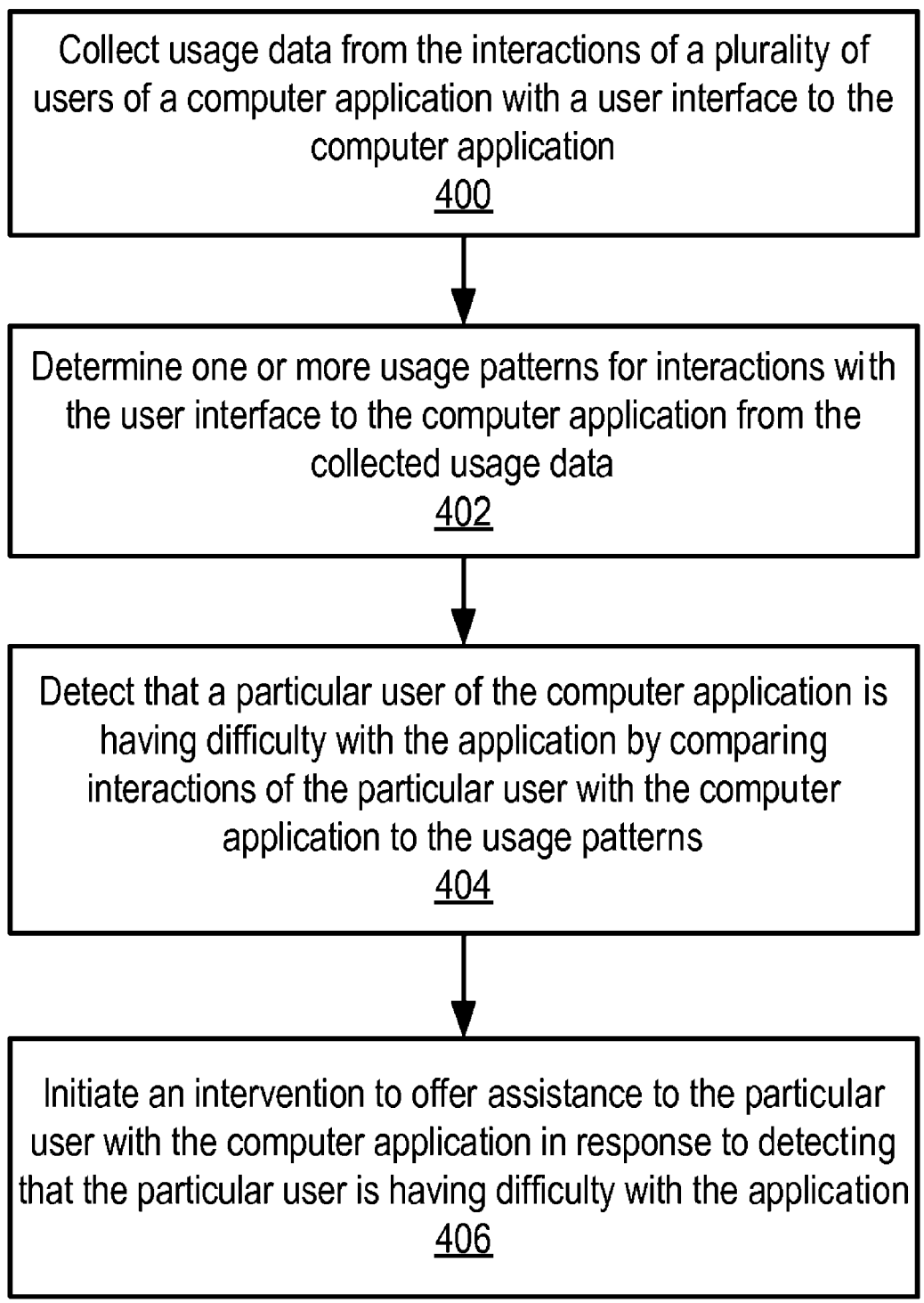
FIG. 11 is a flowchart illustrating a method of variable help content and abandonment intervention according to one embodiment.

FIG. 11 is a flowchart illustrating a method of variable help content and abandonment intervention according to one embodiment. As indicated at 400, usage data from the interactions of a plurality of users of a computer application with a user interface to the computer application may be collected. For example, a component of a pattern detection and intervention mechanism that resides on a server system coupled to a network may collect the usage data from user interactions with a plurality of instances of the computer application on client systems coupled to the network.

As indicated at 402 one or more usage patterns for interactions with the user interface to the computer application may be determined from the collected usage data. In one embodiment, the determining of the one or more usage patterns may be performed in accordance with one or more statistical data analysis techniques applied to the collected usage data. Note that the usage patterns may include, but are not limited to, usage patterns that indicate expected or nominal interactions with the computer application and usage patterns that indicate abnormal interactions with the computer application. These abnormal interactions may indicate, for example, that a user is having difficulty with the computer application or that the user is likely to discontinue use of the computer application.

As indicated at 404, interactions of a particular user with the computer application may be compared to the determined usage patterns to detect differences which may indicate, for example, that the particular user is having difficulty with the application. In one embodiment, usage data from the interaction of the particular user of the computer application with the user interface to the computer application may be collected and compared with at least one of the one of the one or more determined usage patterns. In one embodiment, usage data from the interaction of the particular user may deviate from a usage pattern that indicates expected or nominal interactions with the computer application. In one embodiment, usage data from the interaction of the particular user may match a usage pattern that indicates that a user is having difficulty with the computer application or even that the user is likely to discontinue use of the computer application.

In one embodiment, the interactions of a particular user with the computer application may be compared to usage patterns specific to the particular user determined from previously collected interactions of the particular user with the computer application. Deviations from the usage patterns may be used as indications that the particular user is having difficulty with the computer application or that the particular user is likely to discontinue use of the computer application.

As indicated at 406 an intervention to offer assistance to the particular user with the computer application may be initiated in response to detecting that the particular user is having difficulty with the application. In one embodiment, the intervention may include displaying help information related to the computer application. In one embodiment, the intervention may include displaying contact information for a support system of the computer application. The contact information may include, but is not limited to, one or more of a telephone number to the support system and a web address to a web site of the support system. In one embodiment, the intervention may include a support system of the computer application contacting the particular user. Contacting the particular user may include, but is not limited to, one or more of telephoning the particular user, instant messaging the particular user, text messaging the particular user, and sending an electronic mail message to the particular user.

In one embodiment, the comparison of the usage data from the interaction of the particular user with the determined usage patterns may indicate that the particular user is having difficulty in completing a particular task via the user interface to the computer application. The intervention may include, but is not limited to, offering assistance related to the particular task of the computer application.

In one embodiment, the computer application may be a tax preparation program. The comparison of the usage data from the interaction of the particular user with the determined usage patterns may, for example, indicate that the particular user is having difficulty in completing a particular electronic tax form via the user interface to the tax preparation program, and may further indicate that the particular user is likely to discontinue use of the tax preparation program. The intervention may include, but is not limited to, one or more of providing help information related to at least one aspect of the particular electronic tax form, providing an alternative user interface to at least a portion of the particular electronic tax form, and providing an option to automatically complete at least a portion of the particular electronic tax form. The detection that particular users are having difficulty with the application and proactive intervention when such difficulties are detected may help to lower frustration that may be caused by use of the tax preparation program.

Exemplary System

Various components of embodiments of a pattern detection and intervention mechanism as described herein may be executed on one or more computer systems, which may interact with various other devices. One such computer system is illustrated by FIG. 12. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for the pattern detection and intervention mechanism, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example.

In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 12, memory 720 may include program instructions 725, configured to implement at least a portion of embodiments of the pattern detection and intervention mechanism as described herein, and data storage 735, comprising various documents, tables, databases, etc. accessible by program instructions 725. In one embodiment, program instructions 725 may include software elements of the pattern detection and intervention mechanism illustrated in the Figures, and data storage 735 may include data used in embodiments of the pattern detection and intervention mechanism. In other embodiments, different software elements and data may be included.

Those skilled in the art will appreciate that computer system 700 is merely illustrative and is not intended to limit the scope of the pattern detection and intervention mechanism as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   collecting usage data from interactions between a plurality of users of a computer application and a graphical electronic tax form presented on a user interface of the computer application;
   determining a plurality of determined usage patterns for interactions with the user interface of the computer application from the collected usage data,
      wherein the plurality of determined usage patterns comprises a normal usage pattern and an abnormal usage pattern,
      wherein the normal usage pattern corresponds to a first subset of usage data collected from a first subset of the plurality of users that completed the graphical electronic tax form with minimal difficulty, and
      wherein the abnormal usage pattern corresponds to a second subset of usage data collected from a second subset of the plurality of users that had difficulty completing the graphical electronic tax form;
   presenting the graphical electronic tax form to a particular user of the computer application, wherein the graphical electronic tax form prompts the particular user to input data related to a tax filing for submission to a taxing authority;
   detecting a usage pattern of interactions between the particular user and the computer application;
   comparing the usage pattern to at least one of the plurality of determined usage patterns;

determining, based on comparing the usage pattern, that the particular user is having difficulty related to the inputting data into the presented graphical form; and initiating an intervention to offer assistance to the particular user with the inputting data into the presented graphical form in response to determining that the particular user of the computer application is having difficulty.

2. The computer-implemented method as recited in claim 1, wherein detecting the usage pattern of interactions between the particular user and the computer application comprises:

collecting new usage data from the interactions of the particular user of the computer application with the user interface to the computer application.

3. The computer-implemented method as recited in claim 1, wherein determining the plurality of determined usage patterns is performed in accordance with one or more statistical data analysis techniques.

4. The computer-implemented method as recited in claim 1, wherein said intervention comprises displaying help information related to the computer application.

5. The computer-implemented method as recited in claim 1, wherein said intervention comprises displaying contact information for a support system of the computer application.

6. The computer-implemented method as recited in claim 5, wherein said contact information comprises one or more of a telephone number to the support system and a web address to a web site of the support system.

7. The computer-implemented method as recited in claim 1, wherein said intervention comprises a support system of the computer application contacting the particular user.

8. The computer-implemented method as recited in claim 7, wherein contacting the particular user comprises one or more of telephoning the particular user, instant messaging the particular user, text messaging the particular user, and sending an electronic mail message to the particular user.

9. The computer-implemented method as recited in claim 1, wherein determining, based on comparing the usage pattern to at least one of the plurality of determined usage patterns, that the particular user is having difficulty further indicates that the particular user is having difficulty in completing a particular task via the user interface to the computer application, wherein said intervention comprises offering assistance related to the particular task of the computer application.

10. The computer-implemented method as recited in claim 1, wherein the computer application is a tax preparation program.

11. The computer-implemented method as recited in claim 10, wherein determining, based on comparing the usage pattern to at least one of the plurality of determined usage patterns, that the particular user is having difficulty further indicates that the particular user is having difficulty in completing a particular electronic tax form via the user interface to the tax preparation program.

12. The computer-implemented method as recited in claim 11, wherein said intervention comprises providing help information related to at least one aspect of the particular electronic tax form.

13. The computer-implemented method as recited in claim 11, wherein said intervention comprises providing an alternative user interface to at least a portion of the particular electronic tax form.

14. The computer-implemented method as recited in claim 11, wherein said intervention comprises providing an option to automatically complete at least a portion of the particular electronic tax form.

15. The computer-implemented method as recited in claim 1,
wherein the normal usage pattern indicates expected interactions with the computer application, and
wherein detecting the usage pattern of interactions between the particular user and the computer application comprises detecting that the interactions of the particular user deviate from the normal usage pattern of the plurality of determined usage patterns.

16. The computer-implemented method as recited in claim 1,
wherein the abnormal usage pattern indicates unexpected interactions with the computer application, and
wherein detecting the usage pattern of interactions between the particular user and the computer application comprises detecting that the interactions of the particular user match the abnormal usage pattern of the plurality of determined usage patterns.

17. A system, comprising:
one or more processors;
a display device; and
a memory coupled to the one or more processors and the display device, wherein the memory comprises program instructions executable by the one or more processors to implement a computer application and a pattern detection and intervention mechanism,
wherein the computer application comprises a graphical form presented on a user interface that prompts a particular user of the computer application to input data related to a tax filing for submission to a taxing authority, and
wherein the pattern detection and intervention mechanism is configured to:
collect usage data from the interaction of the particular user of the computer application with the user interface;
compare the collected usage data from the interaction of the particular user with at least one of a plurality of determined usage patterns collected from interactions of a plurality of users of the computer application with the user interface,
wherein the plurality of determined usage patterns comprises a normal usage pattern and an abnormal usage pattern,
wherein the normal usage pattern corresponds to a first subset of usage data collected from a first subset of the plurality of users that completed the graphical electronic tax form with minimal difficulty, and
wherein the abnormal usage pattern corresponds to a second subset of usage data collected from a second subset of the plurality of users that had difficulty completing the graphical electronic tax form;
determine, based on comparing the collected usage data with at least one of a plurality of determined usage patterns, that the particular user is having difficulty inputting data into the presented graphical form; and
initiate an intervention to offer assistance to the particular user with the inputting data into the presented graphical form in response to a determinion that the particular user of the computer application is having difficulty.

18. The system as recited in claim 17, wherein said intervention comprises displaying help information related to the computer application on the display device.

19. The system as recited in claim 17,
wherein said intervention comprises displaying contact information for a support system of the computer application on the display device,
wherein said contact information comprises one or more of a telephone number to the support system and a web address to a web site of the support system.

20. The system as recited in claim 17,
wherein said intervention comprises a support system of the computer application contacting the particular user,
wherein contacting the particular user comprises one or more of telephoning the particular user, instant messaging the particular user, text messaging the particular user, and sending an electronic mail message to the particular user.

21. The system as recited in claim 17, wherein the computer application is a tax preparation program.

22. The system as recited in claim 21, wherein determining, based on comparing the collected usage data with at least one of the plurality of determined usage patterns, that the particular user is having difficulty further indicates that the particular user is having difficulty in completing a particular electronic tax form displayed on the display device via the user interface to the tax preparation program.

23. The system as recited in claim 22, wherein said intervention comprises displaying help information related to at least one aspect of the particular electronic tax form on the display device.

24. The system as recited in claim 22, wherein said intervention comprises displaying an alternative user interface to at least a portion of the particular electronic tax form on the display device.

25. The system as recited in claim 22, wherein said intervention comprises displaying an option to automatically complete at least a portion of the particular electronic tax form on the display device.

26. The system as recited in claim 17,
wherein the normal usage pattern indicates expected interactions with the computer application, and
wherein, to detect that the particular user of the computer application is having difficulty inputting data into the presented graphical form, the pattern detection and intervention mechanism is further configured to detect that the interaction of the particular user with the user interface of the computer application deviates from the normal usage pattern of the plurality of determined usage patterns.

27. The system as recited in claim 17,
wherein the abnormal usage pattern indicates unexpected interactions with the computer application, and
wherein, to detect that the particular user of the computer application is having difficulty inputting data into the presented graphical form, the pattern detection and intervention mechanism is further configured to detect that the interaction of the particular user with the user interface of the computer application matches the abnormal usage pattern of the plurality of determined usage patterns.

28. A system, comprising:
a network;
a plurality of client devices configured to couple to the network, wherein each client device comprises an instance of a particular computer application comprising a graphical electronic tax form presented on a user interface; and
a server device configured to couple to the network, wherein the server device is configured to:
collect usage data from interactions of a plurality of users with the instances of the computer application on the client devices;
determine a plurality of determined usage patterns for interactions with the computer application from the collected usage data,
wherein the plurality of determined usage patterns comprises a normal usage pattern and an abnormal usage pattern,
wherein the normal usage pattern corresponds to a first subset of usage data collected from a first subset of the plurality of users that completed the graphical electronic tax form with minimal difficulty, and
wherein the abnormal usage pattern corresponds to a second subset of usage data collected from a second subset of the plurality of users that had difficulty completing the graphical electronic tax form;
send the graphical electronic tax form to a particular user of a particular instance of the computer application, wherein the graphical electronic tax form prompts the particular user to input data related to a tax filing for submission to a taxing authority;
detect a usage pattern of interactions between the particular user and the particular instance of the computer application
compare the usage pattern of interactions to at least one of the plurality of determined usage patterns;
determine, based on comparing the usage pattern of interactions to at least one of the plurality of determined usage patterns, that the particular user is having difficulty related to the inputting data into the presented graphical form; and
initiate an intervention to offer assistance to the particular user with the inputting data into the presented graphical form in response to said a determination that the particular user is having difficulty.

29. The system as recited in claim 28, wherein said intervention comprises displaying help information related to the computer application on the particular one of the plurality of client devices.

30. The system as recited in claim 28, wherein said intervention comprises displaying contact information for a support system of the computer application on the particular one of the plurality of client devices, wherein said contact information comprises one or more of a telephone number to the support system and a web address to a web site of the support system.

31. The system as recited in claim 28, wherein said intervention comprises a support system of the computer application contacting the particular user, wherein said contacting the particular user comprises one or more of telephoning the particular user, instant messaging the particular user, text messaging the particular user, and sending an electronic mail message to the particular user.

32. The system as recited in claim 28, wherein the computer application is a tax preparation program.

33. The system as recited in claim 28,
wherein the normal usage pattern indicates expected interactions with the computer application, and
wherein, to detect that the particular user is having difficulty inputting data into the presented graphical form, the server device is further configured to detect that the interactions of the particular user with the particular instance of the computer application deviate from the normal usage pattern of the plurality of determined usage patterns.

34. The system as recited in claim 28,
wherein the abnormal usage pattern indicates unexpected interactions with the computer application, and
wherein, to detect that the particular user of the computer application is having difficulty inputting data into the presented graphical form, the server device is further configured to detect that the interactions of the particular user with the particular instance of the computer application matches the abnormal usage pattern of the plurality of determined usage patterns.

35. A system, comprising:
a network;
a plurality of client devices configured to couple to the network, wherein each client device comprises an instance of a particular computer application comprising a graphical electronic tax form presented on a user interface; and
a server device configured to couple to the network, wherein the server device is configured to:
collect usage data from interactions of a plurality of users with the instances of the computer application on the client devices; and
determine a plurality of determined usage patterns for interactions with the computer application from the collected usage data,
wherein the plurality of determined usage patterns comprises a normal usage pattern and an abnormal usage pattern,
wherein the normal usage pattern corresponds to a first subset of usage data collected from a first subset of the plurality of users that completed the graphical electronic tax form with minimal difficulty, and
wherein the abnormal usage pattern corresponds to a second subset of usage data collected from a second subset of the plurality of users that had difficulty completing the graphical electronic tax form,
wherein each of the plurality of client devices is configured to:
present the graphical electronic tax form to a particular user of a particular instance of the computer application, wherein the graphical electronic tax form prompts the particular user to input data related to a tax filing for submission to a taxing authority;
detect a usage pattern of interactions between the particular user and the particular instance of the computer application,
compare the usage pattern of interactions to at least one of the plurality of determined usage patterns;
determine, based on comparing the usage pattern of interactions to at least one of the plurality of determined usage patterns, that the particular user is having difficulty related to the inputting data into the presented graphical form; and
initiate an intervention to offer assistance to the particular user with the inputting data into the presented graphical form in response to said determining that the particular user is having difficulty.

36. The system as recited in claim 35, wherein said intervention comprises displaying help information related to the computer application on the particular one of the plurality of client devices.

37. The system as recited in claim 35, wherein said intervention comprises displaying contact information for a support system of the computer application on the particular one of the plurality of client devices, wherein said contact information comprises one or more of a telephone number to the support system and a web address to a web site of the support system.

38. The system as recited in claim 35, wherein said intervention comprises a support system of the computer application contacting the particular user, wherein said contacting the particular user comprises one or more of telephoning the particular user, instant messaging the particular user, text messaging the particular user, and sending an electronic mail message to the particular user.

39. The system as recited in claim 35, wherein the computer application is a tax preparation program.

40. The system as recited in claim 35,
wherein the normal usage pattern indicates expected interactions with the computer application, and
wherein, to detect that the particular user is having difficulty inputting data into the presented graphical form, the plurality of client devices are further configured to detect that the interactions of the particular user with the particular instance of the computer application deviates from the normal usage pattern of the plurality of determined usage patterns.

41. The system as recited in claim 35,
wherein the abnormal usage pattern indicates unexpected interactions with the computer application, and
wherein, to detect that the particular user of the computer application is having difficulty inputting data into the presented graphical form the plurality of client devices are further configured to detect that the interactions of the particular user with the particular instance of the computer application matches the abnormal usage pattern of the plurality of determined usage patterns.

42. A computer readable storage medium, comprising program instructions, wherein the program instructions are computer-executable to implement:
collecting usage data from interactions between a plurality of users of a computer application and a graphical electronic tax form presented on a user interface of the computer application;
determining a plurality of determined usage patterns for interactions with the user interface of the computer application from the collected usage data,
wherein the plurality of determined usage patterns comprises a normal usage pattern and an abnormal usage pattern,
wherein the normal usage pattern corresponds to a first subset of usage data collected from a first subset of the plurality of users that completed the graphical electronic tax form with minimal difficulty, and
wherein the abnormal usage pattern corresponds to a second subset of usage data collected from a second subset of the plurality of users that had difficulty completing the graphical electronic tax form;
presenting the graphical electronic tax form to a particular user of the computer application, wherein the graphical electronic tax form prompts the particular user to input data related to a tax filing for submission to a taxing authority;
detecting a usage pattern of interactions between the particular user and the computer application;
comparing the usage pattern to at least one of the plurality of determined usage patterns;
determining, based on comparing the usage pattern to at least one of the plurality of determined usage patterns, that the particular user is having difficulty related to the inputting data into the presented graphical form; and initiating an intervention to offer assistance to the particular user with the inputting data into the presented graphical form in response to determining that the particular user of the computer application is having difficulty.

43. The computer readable storage medium as recited in claim 42, wherein, in detecting the usage pattern of interactions between the particular user and the computer application, the program instructions are computer-executable to implement:

collecting new usage data from the interaction of the particular user of the computer application with the user interface to the computer application.

44. The computer readable storage medium as recited in claim 42, wherein, in determining the plurality of determined usage patterns is performed in accordance with one or more statistical data analysis techniques.

45. The computer readable storage medium as recited in claim 42, wherein said intervention comprises displaying help information related to the computer application.

46. The computer readable storage medium as recited in claim 42,
wherein said intervention comprises displaying contact information for a support system of the computer application,
wherein said contact information comprises one or more of a telephone number to the support system and a web address to a web site of the support system.

47. The computer readable storage medium as recited in claim 42,
wherein said intervention comprises a support system of the computer application contacting the particular user,
wherein contacting the particular user comprises one or more of telephoning the particular user, instant messaging the particular user, text messaging the particular user, and sending an electronic mail message to the particular user.

48. The computer readable storage medium as recited in claim 42, wherein the computer application is a tax preparation program.

49. The computer readable storage medium as recited in claim 42,
wherein the normal usage pattern indicates expected interactions with the computer application, and
wherein, in detecting the usage pattern of interactions between the particular user with the user and the application comprises detecting that the interactions of the particular user deviate from the normal usage pattern of the plurality of determined usage patterns.

50. The computer readable storage medium as recited in claim 42,
wherein the abnormal usage pattern indicates unexpected interactions with the computer application, and
wherein, in detecting the usage pattern of interactions between the particular and the computer application comprises detecting that the interactions of the particular user match the abnormal usage pattern of the plurality of determined usage patterns.

\* \* \* \* \*

UNITED STATES PATENT AND TRADEMARK OFFICE
CERTIFICATE OF CORRECTION

| | | |
|---|---|---|
| PATENT NO. | : 8,024,660 B1 | Page 1 of 1 |
| APPLICATION NO. | : 11/669525 | |
| DATED | : September 20, 2011 | |
| INVENTOR(S) | : Christopher Neil Quinn et al. | |

It is certified that error appears in the above-identified patent and that said Letters Patent is hereby corrected as shown below:

In Claim 49, Column 28 (line 18), "with the user" should be deleted.

Signed and Sealed this
Thirteenth Day of December, 2011

David J. Kappos
*Director of the United States Patent and Trademark Office*